United States Patent [19]

Akizawa et al.

[11] Patent Number: 5,497,488

[45] Date of Patent: Mar. 5, 1996

[54] SYSTEM FOR PARALLEL STRING SEARCH WITH A FUNCTION-DIRECTED PARALLEL COLLATION OF A FIRST PARTITION OF EACH STRING FOLLOWED BY MATCHING OF SECOND PARTITIONS

[75] Inventors: Mitsuru Akizawa, Hachioji; Kouki Noguchi, Kokubunji; Takehisa Hayashi, Sagamihara; Kanji Kato, Tokorozawa; Hitoshi Matsushima, Tachikawa, all of Japan

[73] Assignees: Hitachi, Ltd., Tokyo; Hitachi Maxell, Ltd., Osaka, both of Japan

[21] Appl. No.: 402,560

[22] Filed: Mar. 13, 1995

Related U.S. Application Data

[63] Continuation of Ser. No. 797,346, Nov. 25, 1991, abandoned, which is a continuation-in-part of Ser. No. 537,491, Jun. 12, 1990, abandoned.

[30] Foreign Application Priority Data

Nov. 30, 1990 [JP] Japan ................................ 2-328893

[51] Int. Cl.⁶ .................................................. G06F 17/30
[52] U.S. Cl. ...................... 395/600; 364/DIG. 1; 364/225.3; 364/419.13
[58] Field of Search ......................... 395/600; 364/419.13

[56] References Cited

U.S. PATENT DOCUMENTS

| | | | |
|---|---|---|---|
| 4,558,302 | 12/1985 | Welch | 341/51 |
| 5,051,886 | 9/1991 | Kawaguchi et al. | 395/575 |
| 5,051,947 | 9/1991 | Messenger et al. | 395/800 |
| 5,060,143 | 10/1991 | Lee | 395/600 |
| 5,175,860 | 12/1992 | Yamada | 395/800 |
| 5,201,048 | 4/1993 | Coulter et al. | 395/600 |
| 5,212,697 | 5/1993 | Morita | 371/68.1 |
| 5,319,629 | 6/1994 | Henshaw et al. | 369/103 |
| 5,319,776 | 6/1994 | Hile et al. | 395/575 |

FOREIGN PATENT DOCUMENTS

| | | |
|---|---|---|
| 64-42784 | 2/1989 | Japan . |
| 2200228 | 7/1988 | United Kingdom ............ G11C 15/04 |

OTHER PUBLICATIONS

Japanese Application 6442784.
Electronische Rechenanlagen-mit Computer Praxis, vol. 26, No. 4, Aug. 1984, pp. 179–185.
IEEE Proceedings, vol. 136, Pt. E, No. 5, Sep. 1989, "Content-Addressable mass memories", pp. 351–356.
Proceedings of the IEEE Custom Integrated Circuits Conference 1988, "Real-Time String Search Engine LSI for 800-Mbit/sec LANs" pp. 2161–2164.
Proceedings of Conpar. Conference Papers: Plenary Sessions, Sep. 1988, British Computer Soceity, "Mapping with no strings attached", pp. 157–165.

(List continued on next page.)

*Primary Examiner*—Thomas G. Black
*Assistant Examiner*—Wayne Amsbury
*Attorney, Agent, or Firm*—Fay, Sharpe, Beall, Fagan, Minnich & McKee

[57] ABSTRACT

A character string search arithmetic operation is performed at high speed with a small hardware scale processing module, such as a symbol string search module. The search module is connected to a CPU through address and data buses and includes a function definition section for defining a function of the apparatus in accordance with a command from the CPU, a data input/output section for receiving a symbol string to be searched through the data bus and for outputting the result of a search. A search processing section performs the search based on a function defined by the function definition section. A symbol string to be searched for, which is internally stored, is compared with the symbol string data input to the module's data input/output means. A condition holding section holds data indicative of an internal condition corresponding to the result of the search processing. Thereby, the CPU and the symbol string search module can perform the search at high speed.

29 Claims, 17 Drawing Sheets

OTHER PUBLICATIONS

Proceedings of the Spring Joint Computer Conference, May 1971, "An associative processor for air traffic control", pp. 49–59.

Proceedings of the 1989 IEEE International Conference on Computer Design: VLSI in Computers and Processors, Oct. 1989, "Performance and Microarchitecture of the i486 processor", pp. 182–187.

Toshiba Review, No. 138, 1982, "CMOS 8-bit 1-chip microcomputer TMP80C49", pp. 29–32.

"Operational Characters of a Hardware-Based Pattern Matcher", ACM Transactions on Database Systems, vol. 8, No. 1, 1983.

"Efficient String Matching", Communications of the ACM, vol. 18, No. 6, 1975.

FIG.4
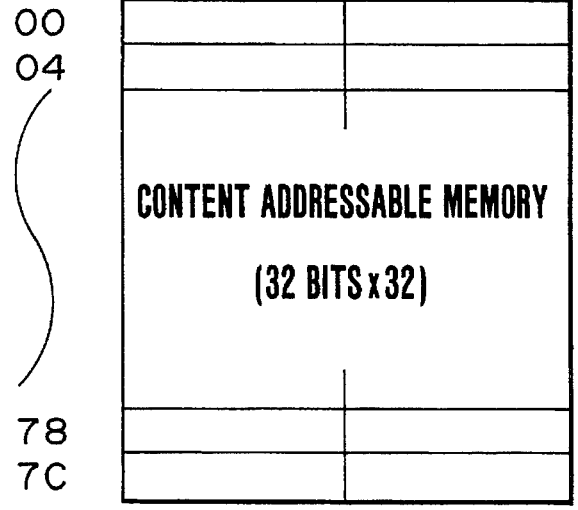
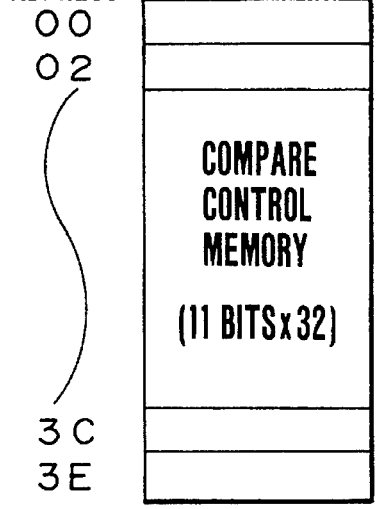
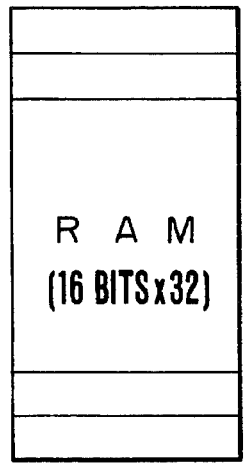

COMPARE CONTROL MEMORY FORMAT

✶ UNUSED

FIG.10

| | (INPUT) | | (OUTPUT) |
|---|---|---|---|
| | Bn (COMPARE CONDITION) | RESULT OF COMPARE FOR ONE BYTE | RESULT OF COMPARE INCLUDING COMPARE CONDITION |
| | M BIT    L BIT | | |
| (Pstv) | ○      ○ | ○ | ○ |
| | ○      ○ | — | — |
| (ngty) | ○      — | ○ | — |
| | ○      — | — | ○ |
| (dntc) | —      ○ | ✳ | — |
| (invd) | —      — | ✳ | ○ |

✳ : DON'T CARE INPUT $X_n = \begin{cases} 0 : \text{ABSENCE OF HIT} \\ 1 : \text{PRESENCE OF HIT} \end{cases}$
$Y_n = \begin{cases} 0 : \text{ABSENCE OF HIT,} \\ \quad\ \text{OR SINGLE HIT} \\ 1 : \text{PLURAL HITS} \end{cases}$
$Z_n = \begin{cases} 0 : \text{ABSENCE OF HIT,} \\ \quad\ \text{OR PLURAL HITS} \\ 1 : \text{SINGLE HIT} \end{cases}$

FIG.13
1. THE CASE WHERE OUT0 BIT INDICATES RAM OUT
(a) ABSENCE OF HIT
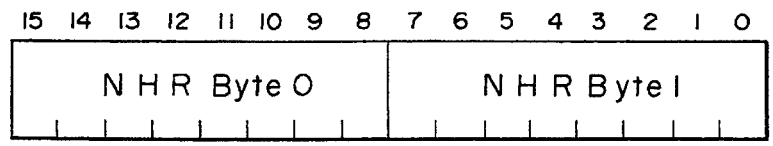
(b) PRESENCE OF HIT
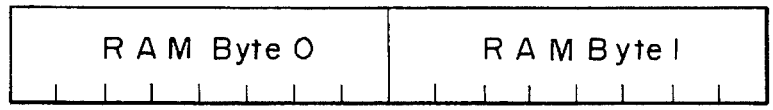
2. THE CASE WHERE OUT0 BIT INDICATES CODE MIX
(a) ABSENCE OF HIT
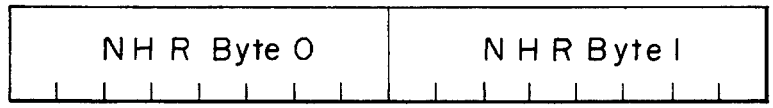
(b) PRESENCE OF HIT
(THE CASE OF ONE-BYTE, TWO-BYTE CODE CHARACTER STRING SEARCH)
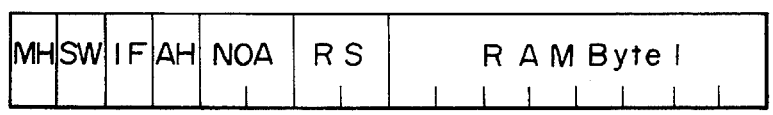
(b) PRESENCE OF HIT
(THE CASE OF BIT PATTERN SEARCH)
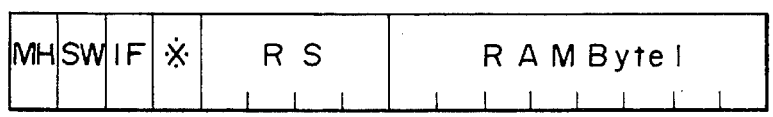

SYSTEM FOR PARALLEL STRING SEARCH WITH A FUNCTION-DIRECTED PARALLEL COLLATION OF A FIRST PARTITION OF EACH STRING FOLLOWED BY MATCHING OF SECOND PARTITIONS

CROSS REFERENCE TO RELATED APPLICATION

This is a continuation appliance of Ser. No. 07/797,346, filed Nov. 25, 1991, now abandoned, which is a continuation-in-part of U.S. application Ser. No. 07/537,491, now abandoned, filed Jun. 12, 1990, the disclosure of which is hereby incorporated by reference.

BACKGROUND OF THE INVENTION

The present invention relates to a semiconductor integrated circuit such a logical LSI, microcomputer or the like. More particularly, the present invention relates to a novel function apparatus (or module) which improves the speed of a symbol string search processing, a single-chip microcomputer which includes such an apparatus (or module) and a system which uses such a microcomputer.

As the amount of document data handled by an information processing equipment increases, the demand for performing a high-speed data search has also increased. In a full text search in which the search of text data is made by use of not an index but an arbitrarily set keyword, it is important to make at a high speed a so-called string search or a character string search which makes a search for a keyword existing in text data.

A high-speed algorithm for search of text data for a plurality of keywords has hitherto been known and is realized by a software on a general purpose processor. However, it is difficult to ensure a practical speed in the search of a large-scale database. Recently, there are proposed high-speed techniques which use special purpose hardwares in order to obtain a sufficient search speed. One example of such techniques is disclosed in JP-A-64-42784 entitled "CHARACTER STRING COMPARE APPARATUS AND HIERARCHICAL CHARACTER STRING COMPARE SYSTEM IN THE APPARATUS".

The prior art disclosed by the JP-A-64-42784 concerns a special purpose LSI for use in a character string search. The LSI includes a memory area for registering keywords therein and a logical circuit area for performing a search by comparing the keywords and text data character by character. The plurality of keywords are registered in the memory area and the text data is searched for by the keywords. The number of keywords and the keyword length, which can be set simultaneously, are restricted by the size of the memory area. The above prior art teaches a method and means by which many keywords can be registered by saving the memory area.

More especially, each keyword is symbolized by hierarchical division thereof into short character strings. In the case where a plurality of analogous composite words are set as keywords, that is, in the case where the same character string pattern appears in a plurality of keywords, it is possible to efficiently utilize the memory area since a divisional character string pattern can be used in common. Accordingly, the number of keywords increases which can be registered. However, since the hierarchical symbolization is made, a procedure for making a matching with the original keyword becomes necessary. This causes the increase in a processing time. Also, since the overall search processing is performed by the LSI for a character string search, there is involved a problem that the upper limit of the scale of a circuit, which can be formed with an LSI configuration, restricts the function and the number of keywords capable of being processed and hence only a character string search within the restricted range is possible.

As mentioned, the above prior art has the problem that the search function and the number of keywords capable of being simultaneously searched out or for are restricted by the scale of the hardware. In a character string search, there may frequently be required a so-called approximate search function, that is, a function of searching text data even for keywords which do not exactly match a desired keyword. Therefore, the circuit scale has a tendency to further increase. However, if the circuit scale becomes too large so that the circuit must be LSI-configured on a plurality of chips, the merit of the LSI configuration is decreased since it is not possible to make the best use of the high-speed ability. Further, the use of the special purpose hardware requires a host CPU for controlling this hardware. This also causes an increase in the number of chips.

SUMMARY OF THE INVENTION

An object of the present invention is to provide means which performs a symbol string search such as a character string search or another multi-function arithmetic process at a high speed and with a hardware scale smaller than that in the prior art.

To attain the above object, in the present invention, an apparatus to improve the speed of a symbol string search such as a character string search (hereinafter referred to as a search module or the like) is provided. A CPU and the search module are bus-connected through generalized or universal address and data buses and take over their portions of a symbol string (or character string) search processing.

More particularly, the search module is connected to the CPU through the address bus and the data bus and includes function definition means for defining a function of the search module in accordance with a command from the CPU, data input/output means for receiving a symbol string to be searched through the data bus and for output of the result of the search, search processing means for performing a search processing based on a function defined by the function definition means by use of a symbol string to be searched for which is stored in the search processing means itself and the symbol string to be searched which is inputted to the data input/output means, and condition holding means for holding data indicative of an internal condition corresponding to the result of the search processing.

In the present invention, a software processing on the CPU is fundamental in order to perform a symbol string (or character string) search or the like at a high speed. A portion of that processing is performed by the search module at a high speed, thereby improving the speed of the overall symbol string (or character string) search processing.

Generally, a symbol string (or character string) search processing includes making successive compare or collation with text data from the top or the last of a symbol string (or character string). If a mismatch is found out in the course of the comparison compare, the set position of the text data is shifted and the comparison is resumed from the compare start position of the symbol string (or character string), that is, the top or the last of the symbol string (or character string). Therefore, the frequency of the compare processing at the compare start portion of the symbol string (or character string) becomes very high. The processing at this high-frequency portion is performed by the search module at a high speed and the other low-frequency portion is software-processed by the CPU. Since the high-frequency portion to be processed at a high speed is restricted to the vicinity of the compare start position of the symbol string (or character string), a relatively small scale circuit suffices for the search module. Therefore, it is also possible to integrate the search module and the CPU on the same LSI chip. Thereby, it becomes possible to provide means which searches for a symbol string (or character string) at a high speed and with a hardware scale smaller than that in the prior art.

The above is a concept which forms the basis of a high-speed leading collation processing also disclosed by U.S. application Ser. No. 07/537,491, filed Jun. 12, 1990 which is the parent application of the present application and is entitled "METHOD AND APPARATUS FOR STRING SEARCH".

In the present invention, the CPU and the search module are connected through generalized buses (or the address bus and the data bus), and data to be beforehand set in the search module is written by CPU. The execution of a symbol string (or character string) search is activated by transferring the text data to the search module. The result of the comparison is output to a result storage in the data input/output means of the search module and is read therefrom and interpreted by the CPU.

The CPU and the search module are connected through not a special data bus but a generalized bus. From the CPU, the search module looks though it is mapped in a memory address map. Therefore, the execution of a search processing and the acquisition of the result can be made easily in a procedure similar to the procedure of data transfer for a memory. Mapping at any address is possible. Therefore, in the case where the configuration of a single-chip microcomputer is employed, good matchability with another module is obtained. Also, if the CPU and the search module are integrated as a search processor on the same semiconductor chip, the speed of data transfer between the CPU and the search module is improved. Further, it becomes possible to structure an application system with a hardware scale smaller than that in the prior art.

BRIEF DESCRIPTION OF THE DRAWINGS

FIG. 4 is a diagram for explaining the address mapping of memories and control registers in the search module;

FIG. 10 shows a true value table for explaining the function of the compare logic for producing the result of matching in consideration of a compare condition;

FIG. 13 is a diagram for explaining the format of data outputted to an output register of the data input/output means of the search module shown in FIG. 3;

DESCRIPTION OF THE PREFERRED EMBODIMENTS

Figure 1:
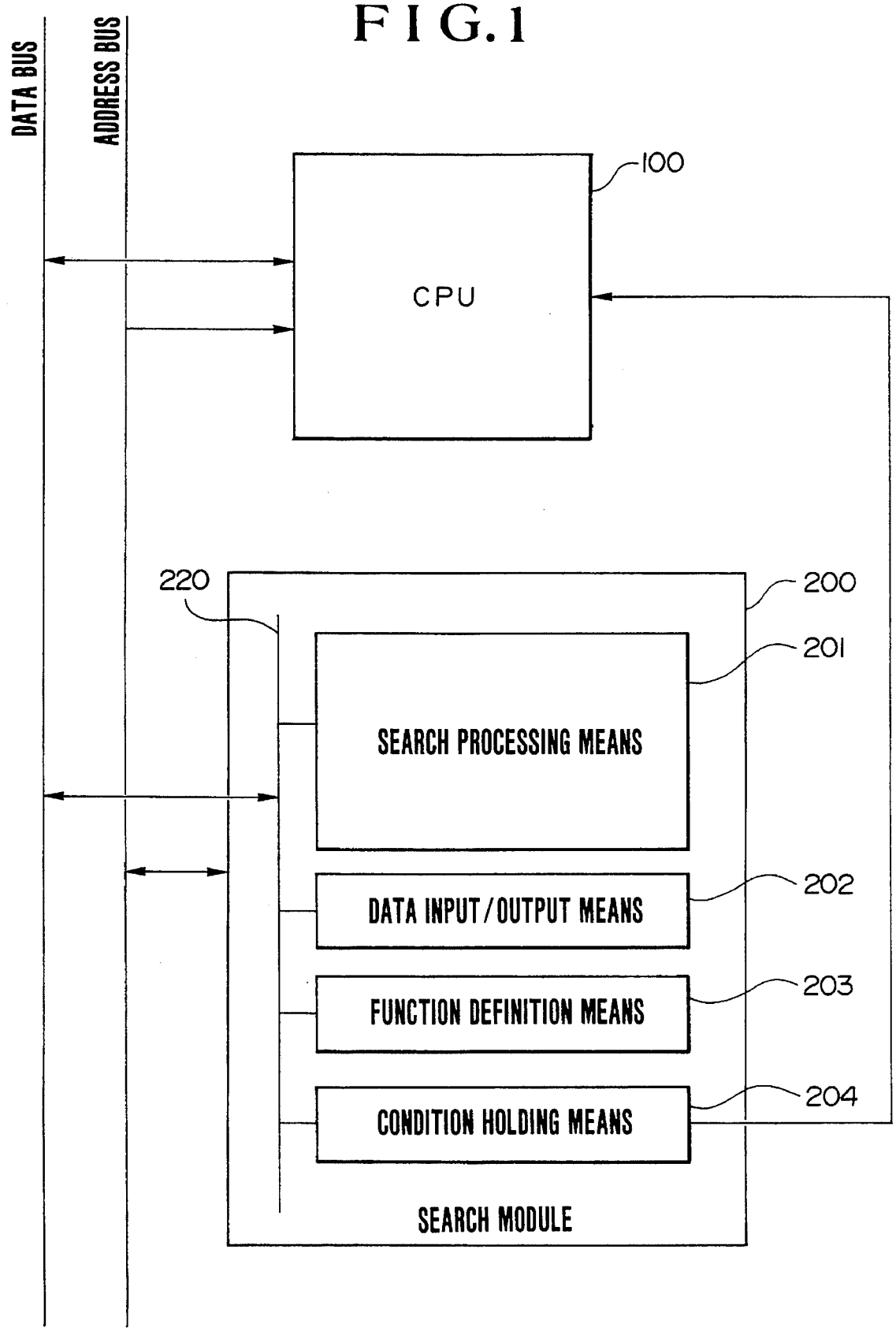
FIG. 1 is a block diagram for explaining the construction of a first embodiment of the present invention.

FIG. 1 shows a block diagram of an embodiment of the present invention. A CPU 100 and a search module 200, which is a multi-function module, are connected through generalized address and data buses. The search module 200 includes data input/output means 202 for data transfer from/to the CPU 100, function definition means 203 for defining the function and operation of the module, condition holding means 204 for reflecting or holding the result of a processing in the search module, and search processing means 201 the function of which is defined by the function definition means 203 and which takes in necessary data from the data input/output means 202 and delivers, to the data input/output means 202, data to be outputted as the result of a search performed. These components are connected to the data bus and can be accessed by addressing from the CPU 100. The operation of each component will now be explained.

A character string(s) or a partial character string(s) is beforehand prepared by a preprocessing from a keyword(s) to be searched out and is set into the search processing means 201 of the search module 200. A mode, which the search module 200 may take, is roughly classified into two modes (or a data set mode and a search mode), depending on a function defined. In this case, the search module 200 is in the data set mode. Next, a command is written from the CPU 100 into the function definition means 203 in order to select a necessary one from among a plurality of functions of the search processing means. When a character string search command is written into the function definition means 203, the search module 200 turns into a search mode and is thereby ready for processing a search.

The search processing is activated by the write of one word of text data (or character data to be searched) into the data input/output means 202. Namely, CPU 100 successively writes the text data into the data input/output means 202 of the search module 200. The text data is sent from the input/output means 202 to the search processing means 201 in which it is compared with all the previously set character strings (or character strings to be searched). This processing is called a leading collation processing. If there is any character string which matches with the text data, data corresponding to that character string is outputted to the data input/output means 202. Even in the case where there is no character string which matches with the text data, data giving notice of the mismatching is outputted to the data input/output means 202. The CPU 100 makes access to the search module 200 to read and interpret data outputted to the data input/output means 202. The CPU 100 determines the next operation in accordance with the result of interpretation. Namely, if the character strings set in the search module include one which matches the inputted text data, this means there is a matching with a compare start portion of a certain keyword. Accordingly, the CPU 100 makes a compare with the succeeding character strings of that keyword. This processing is called a posterior collation processing. On the other hand, in the case where there is no character string which matches with the inputted text data, the CPU 100 performs no posterior collation processing or immediately writes the next text data into the data input/output means 202. The search module not only outputs the result of the search processing to the data input/output means 202 but also reflects the internal condition of the module and the result of the search to the condition holding means 204. Since the content of the condition holding means 204 is directly connected to the CPU 100, it is also possible for the CPU to determine the next operation from that information.

The function of the search processing means 201 may include the designation of an exact search or an approximate search, that is, a search allowing an erroneous character(s), the designation of an anchor matching search or a non-anchor matching search, the designation of a character code length (that is, the designation of a one-byte code or a two-byte code), and so on.

In the conventional arithmetic module, a set of an operand and a command as required are transferred from a CPU. In the present invention, the CPU 100 firstly writes a command into the function definition means 203 of the search module to define one of the combinations of the above-mentioned functions of search. Next, the CPU 100 writes the text data as an operand into the data input/output means 202. Since the search is activated by the write of the data, the succeeding comparing of the text data with the character string(s) set in the search module can be made through the repetition of the write of the data from the CPU 100 into the search module 200 and the read of the data from the search module to the CPU 100. This processing can be performed in a procedure similar to the procedure of access from a CPU to a memory.

As apparent from the above, according to the embodiment of the present invention, it becomes possible to make the execution of a search and the acquisition of the result in a procedure similar to the procedure of data transfer for a memory. Also, the search module can be mapped at any address. Therefore, in the case where the configuration of a single-chip microcomputer is employed, good matchability with another module is obtained. Further, since the search module performs only a leading collation processing, it is possible to realize the search module with a small-scale hardware. Therefore, the CPU and the search module can be integrated as a search processor on the same semiconductor chip, thereby improving the speed of data transfer between the CPU and the search module. Thus, there is obtained an effect that a character string search by a single-chip microcomputer can be performed at a much higher speed as compared with that by the conventional apparatus.

Figure 2:
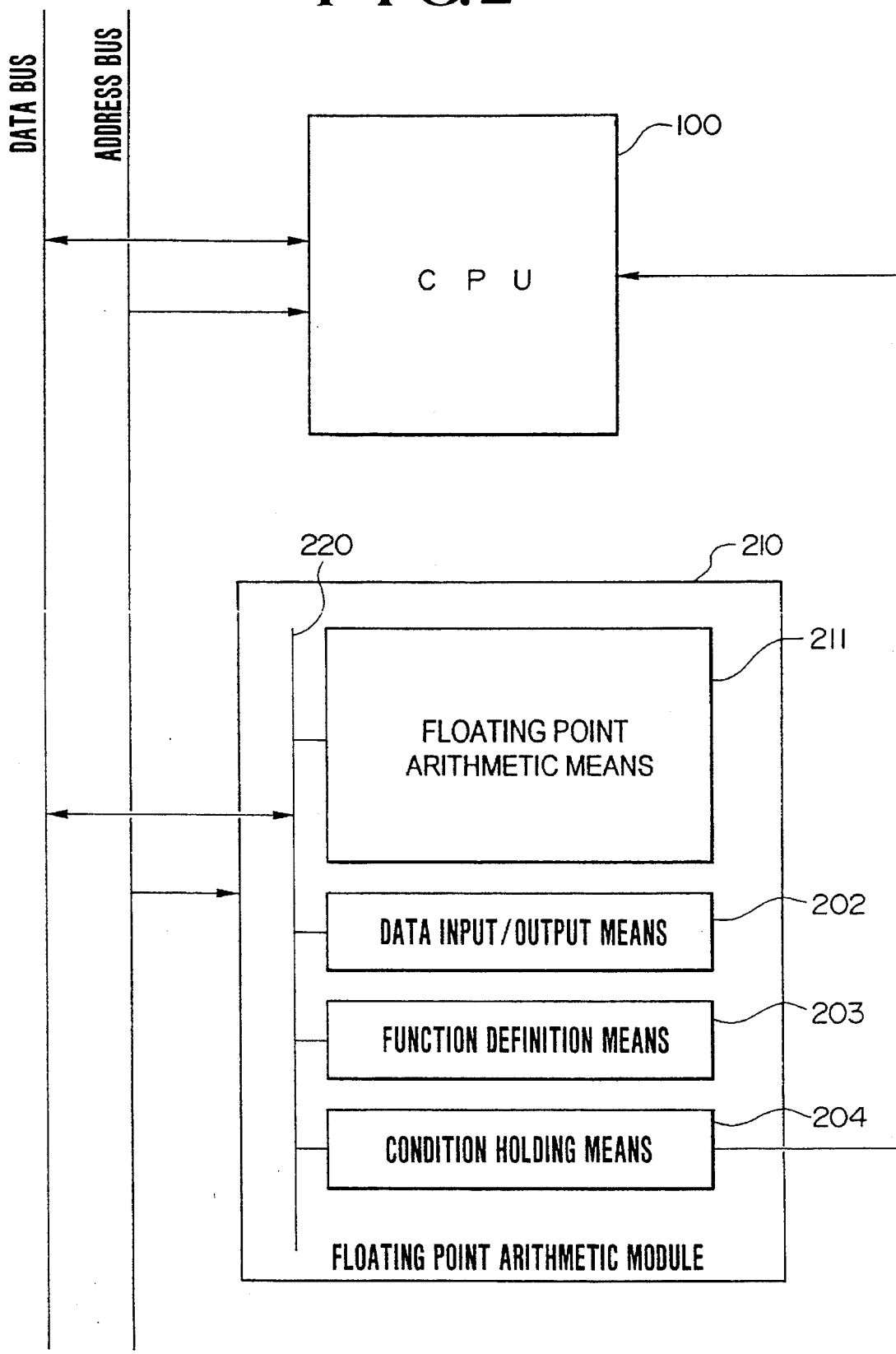
FIG. 2 is a block diagram for explaining the case where the construction of the first embodiment of the present invention is applied for another purpose.

The construction of the embodiment shown in FIG. 1 is applicable to the case where a multi-function arithmetic module other than the search module is used. One example of such a case is shown in FIG. 2. In the example shown in FIG. 2, the construction of the embodiment shown in FIG. 1 is applied to a floating point arithmetic module 210. The floating point arithmetic module 210 includes floating point arithmetic means 211, data input/output means 202, function definition means 203 and condition holding means 204.

Firstly, a command is written from a CPU 100 into the function definition means 203 in order to define a function of the floating point arithmetic means 211. Thereby, the function of the floating point arithmetic module 210 is defined to be, for example, multiplication, division, sum-of-products arithmetic, or the like. Next, the CPU 100 writes a necessary operand(s) into the data input/output means 202. When a required number of operands for the defined arithmetic become complete, an arithemtic processing routine is activated. After the arithmetic processing, the result of arithmetic is written into the data input/output means 202 and the internal condition of the module and a condition code is written into the condition holding means 204. The CPU 100 can know the result of the arithmetic by reading this information. In the case where an arithmetic processing is to be continuously executed with the same function, the arithemtic processing can be performed continuously by writing operands into the data input/output means 202 and reading the results of arithmetic. Namely, in the conventional method, a command is transferred each time one arithmetic operation is executed. On the other hand, in the present invention, it is sufficient to write commands into the function definition means 203 at once prior to the continuous execution of the arithmetic. Therefore, the arithmetic processing speed is improved.

By applying the construction of the present invention shown in FIG. 1 to a multi-function arithmetic processing module as in the above embodiment, there is obtained an effect that the processing speed of a single-chip microcomputer including the multi-function arithmetic processing module is improved.

Figure 3:
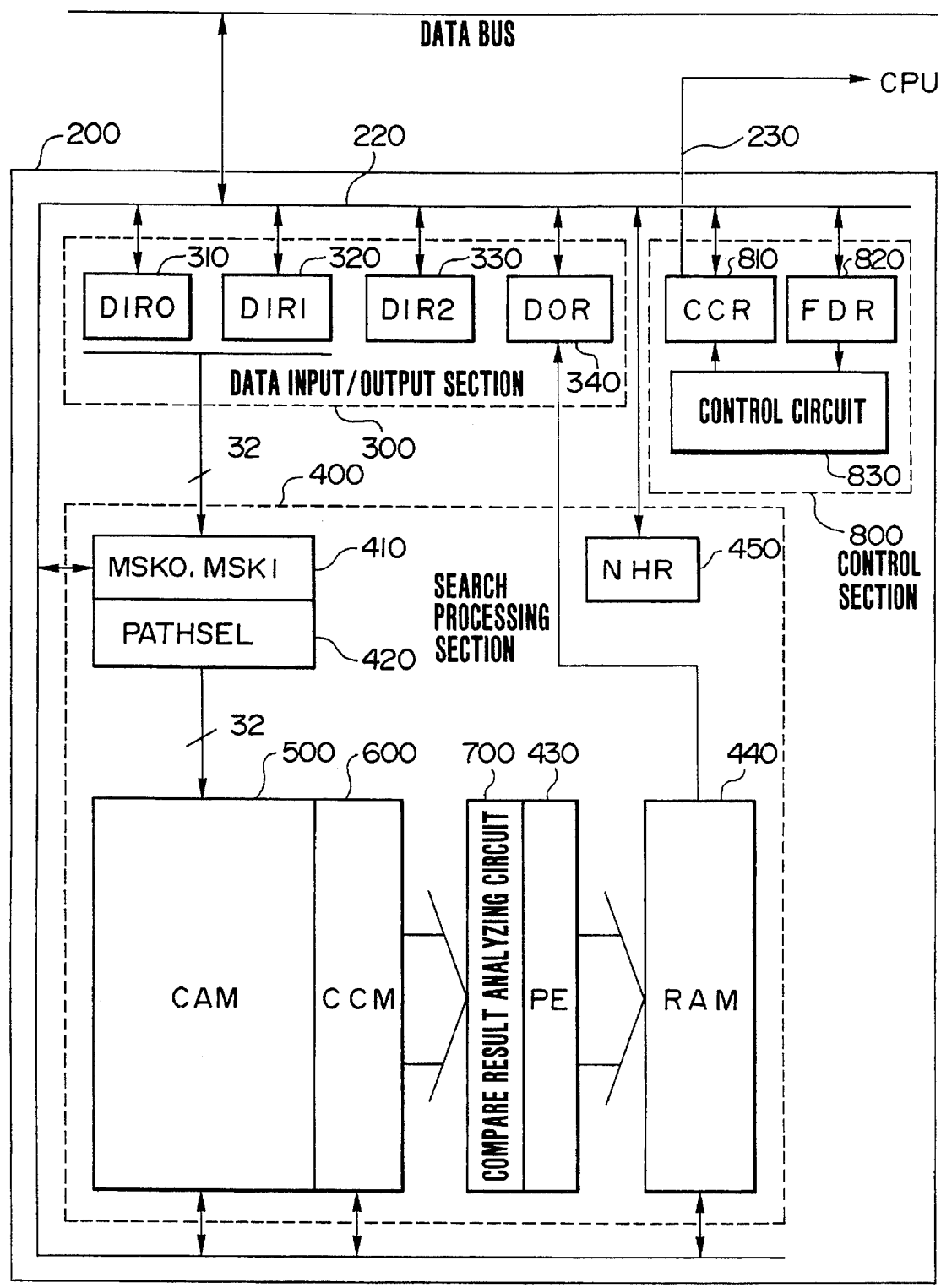
FIG. 3 is a block diagram for explaining a more detailed embodiment of a search module shown in FIG. 1.

FIG. 3 shows a more detailed embodiment of the search module 200 according to the present invention. The module 200 includes a data input/output section 300, a search processing section 400 and a control section 800. Though not strictly correspond to the construction shown in FIG. 1, the data input/output section 300 corresponds to the data input/output means 202, the search processing section 400 corresponds to the search processing means 200, and the control section 800 corresponds to the function definition means 203 and the condition holding means 204. Each section is connected to a data bus through an internal bus 220 of the module 200. The bit width of a data line in the drawings is 16 bits, excepting the case where a specified designation is given. It is of course that the present embodiment can also be realized by using a data line having another different bit width.

The data input/output section 300 is composed of three data input registers (DIR0) 310, (DIR1) 320 and (DIR2) 330 and one data output register (DOR) 340. The data input register has a data shifting function. Data written in the data input register (DIR2) 330 is successively shifted to the data input register (DIR1) 320 and then to the data input register (DIR0) 310. Accordingly, the successive write of data into the data input register (DIR2) 330 from a CPU suffices to cause the flow of data between the data input registers. The contents of the data input registers (DIR0) 310 and (DIR1) 320 are delivered as data of 32 consecutive or connected bits to the search processing section 400. The data output register (DOR) 340 receives and stores the result of search from the search processing section 400. The data input and output registers 310 to 340 are connected to the internal bus 220 so that direct access to them from the CPU is possible.

The search processing section 400 is composed of a mask register (MSK0, MSK1) 410 for masking (or designating a mask to) each bit of data sent from the data input/output section 300, a path selector (PATH SEL) 420 for making a positional interchange of data in units of a byte, a content addressable memory (CAM) 500 for storing a character string(s) or a partial character string(s) to be searched for, a compare control memory (CCM) 600 for storing a condition for compare in the content addressable memory 500, a compare result analyzing circuit 700 for analyzing the number of words matched from the result of the comparison in the content addressable memory 500, a priority encoder (PE) 430 for outputting matching signals of the words matched one by one, a RAM 440 for storing output data, and a non-hit register (NHR) 450 for storing output data when no matching is obtained.

The content addressable memory 500 receives, as inputs, data from the data input/output section 300 through the mask register 410 and the path selector 420 and the content of the compare control memory 600. (Details thereof will be mentioned later on by use of FIG. 9.) The result of the compare processing is transferred to the compare result analyzing circuit 700 and to the priority encoder 430. An output of the priority encoder 430 directly becomes an address of the RAM 440. Thereby, the content of the RAM 440 is read. The read result is transferred to the data input/output section 300 and is held by the data output register (DOR) 340 of the data input/output section 300. On the other hand, the result of analysis by the compare result analyzing circuit 700 is transferred to the control section 800. Thereby, the selection is made of whether data to be set into the data output register (DOR) 340 is the data of the non-hit register 450 or the content of the RAM 440.

The control section 800 is composed of a condition code register (CCR) 810 as condition holding means, a function definition register (FDR) 820 as function definition means, and a control circuit 830. The function definition register 820 and the condition code register 810 are connected to the internal bus of the search module 200. The function definition register 820 transfers the content thereof to the control circuit 830 to make a control for a processing sequence. On the other hand, the condition code register 810 receives data indicative of the condition of the search module during processing or after processing from the control circuit 830. This data is also delivered to the CPU directly by a condition code signal line 230. The control circuit 830 controls the data transfer and the execution of processings in the parts of the data input/output section 300 and the search processing section 400. Control lines for this purpose are omitted from FIG. 3.

The above-mentioned memory and various control registers incorporated in the search module 200 are address-mapped and can be accessed from the CPU by addressing. An address bus is omitted from FIG. 3.

An address map is shown in FIG. 4. In the present embodiment, the content addressable memory (CAM), the RAM, the compare control memory (CCM) and each control register are constructed with 32 bits×32 words, 16 bits×32 words, 11 bits×32 words and 16 bits, respectively. In the search module, the memories and the control registers have sequential address assignment from the 0-th address in individual areas. A change-over between the memory area and the control register area is made by a selection signal for selecting each area. Upon access, an address signal and an area selection signal are combined.

Though the compare control memory 600 and the content addressable memory 500 are assigned to the same address of the same area, an access change-over is made in accordance with the definition of the function of the search module 200 as will be explained later on. Namely, access to the compare control memory area becomes possible only in the case where the access to the compare control memory area is defined for the function definition register 820. In usual operation, the selection of a memory area results in access to the content addressable memory area. In this manner, the memory area of the search module 200 can take a construction similar to that of a usual memory. Thereby, there is obtained an effect that mapping at any address on a memory map is possible in the system level. The present embodiment can also be realized by use of another bit/word construction.

Next, the operation of the present embodiment will be explained.

A character string search is a processing for searching a text (which is a character string to be searched) for a keyword (which is a character string to be searched for or out). It is assumed that a character(s) to be set into the content addressable memory area of the search module and data to be set into the RAM area corresponding thereto are beforehand determined from a given keyword(s).

Firstly, as preparation for a search processing, data are set into the content addressable memory area and the RAM area of the search module 200. Also, a command to define access to the compare control memory area is set into the function definition register 820 and data is set to the compare control memory area. Thereafter, a command to define a character string search is set into the function definition register 820. The search module 200 turns into a search mode and is thereby ready for the search. Text data is written from the CPU into the data input registers (DIR0–2) 310 to 330 to perform the search processing.

The data input/output section 300 shown in FIG. 3 transfers the contents of the data input registers (DIR0) 310 and (DIR1) 320 to the search processing section 400 in the form of data of 32 consecutive bits. For this purpose, there may be a method in which data directly written in the data input registers (DIR0) 310 and (DIR1) 320 are transferred to the search processing section 400 as they are and a method in which data existing in the data input registers (DIR0) 310 and (DIR1) 320 are transferred to the search processing section 400 while data written in the input register (DIR2) 330 is successively shifted in a sequence of DIR2→ DIR1→ DIR0 in a state in which data are present in the data input registers (DIR0) 310 and (DIR1) 320. Either method can be designated by a specified field of the character string search command set into the function definition register 820.

The 32-bit data transferred to the search processing section 400 is masked by the mask register 410 and is then delivered to the path selector 420. Of course the data may be subjected to no masking. The path selector 420 makes an interchange or replacement of the 32-bit data in bit position and in byte position. Thereby, an approximate search can be realized. Of course the bit position and the byte position may be kept as they are. The input data is transferred through the path selector 420 to the content addressable memory 500. The input data is simultaneously compared with all the characters or data which are beforehand set in the content addressable memory 500. In this case, referring to the content of the compare control memory 600, the decision of a matching or a mismatching is made in accordance with the indicated condition. One word of the compare control memory 600 has a one-to-one correspondence to one word of the content addressable memory 500, and the compare control memory 600 designates a condition for compare with data of the content addressable memory 500 in units of one byte. The compare condition may include a positive logic condition under which a matching is determinated when the set data and the input data are the same, a negative logic condition under which a matching is determined when they are different, a do not care condition under which a matching is always determined and an invalid condition under which a mismatching is always determined. In addition, the adoption/non-adoption of a search condition designated by the function definition register 820 can be designated individually. The matching/mismatching in the result of the comparison with the input data is a logical AND of the results for respective bytes. As for words matched, the corresponding contents of the RAM 440 are successively read by the priority encoder (PE) 430 and are set into the data output register (DOR) 340. From the result in the content addressable memory 500, the compare result analyzing circuit 700 makes a decision about the presence/absence of any word matched and a decision as to whether the number of words matched is one or plural. In the case where there is no word matched the content of the non-hit register (NHR) 450 is set into the data output register (DOR) 340. Information acquired by the compare result analyzing circuit 700 is sent to the control section 800 to be used for a sequence control of the search module 200. Also, the internal condition during the search processing is set into the condition code register (CCR) 810. The condition code register (CCR) 810 is directly connected to the CPU by the dedicated bus 230 so that the CPU can refer to the CCR, as required. Of course the CCR can be accessed through the generalized data bus.

Reading the content of the data output register (DOR) 340, the CPU interprets it and takes the next action. Namely, if the matching of the text data with the set character string occurs in the search module 200, this means the matching at a compare start position of the keyword occurs and hence the CPU starts a posterior collection processing. Irrespective of the execution of the posterior collation processing, the CPU successively writes the text data into the search module 200 so that a leading collation processing is always performed by the search module 200.

Figure 5:
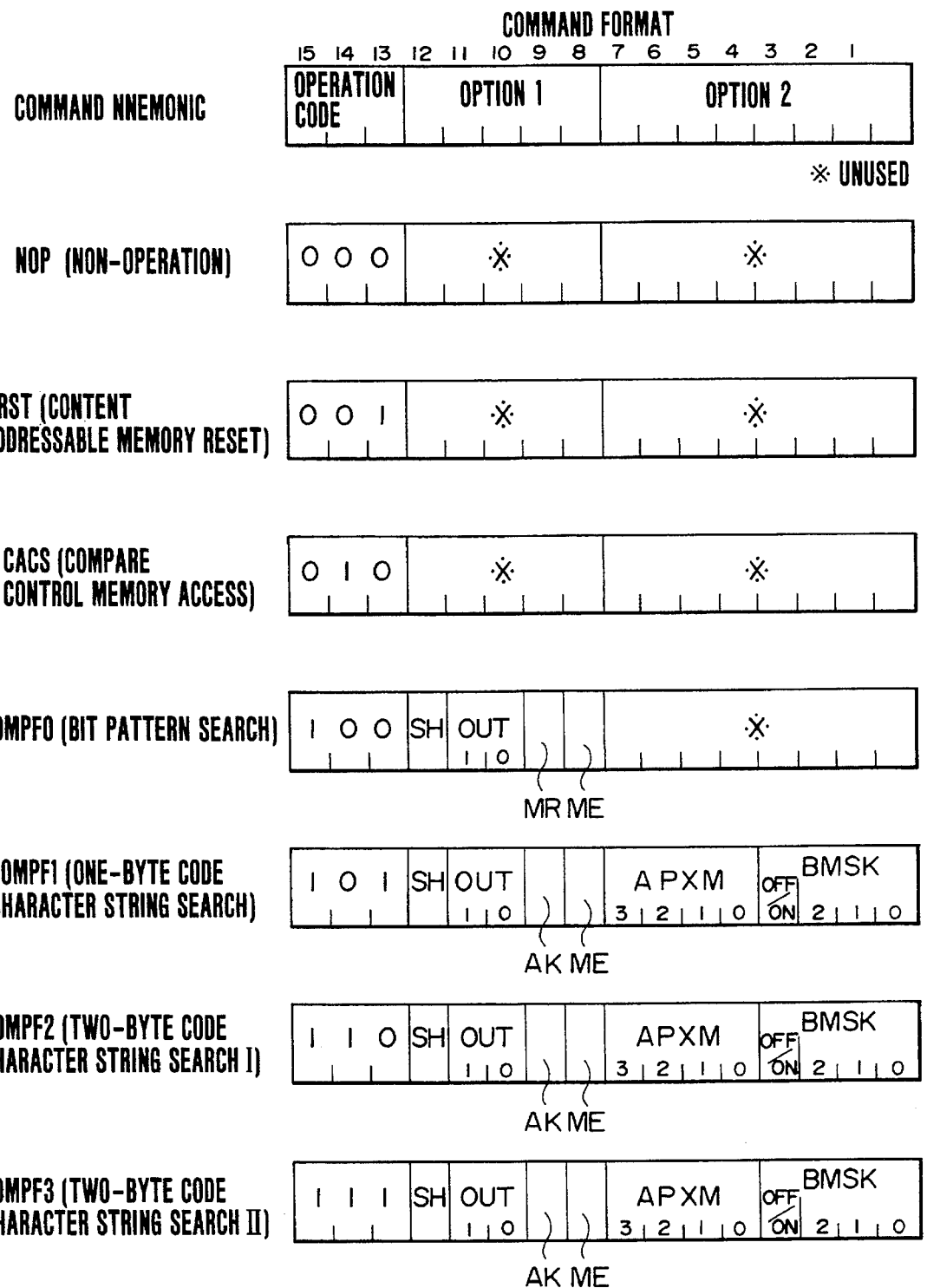
FIG. 5 is a diagram for explaining the formats of commands which define functions of the search module.

FIG. 5 shows the mnemonics and formats of commands set into the function definition register 820 in the present embodiment. The function of the search module 200 is defined by those commands. Each command shown in FIG. 5 basically takes a construction of 16 bits a word but it is of course that another construction can be employed. Each command is as follows.

1. NOP: NON-OPERATION—The search module 200 performs nothing, and the content addressable memory area and the RAM area are made available as a usual memory area.

2. CRST: CONTENT ADDRESSABLE MEMORY (CAM) RESET—A compare condition of the compare control memory 600 is set to the invalid condition so that the content addressable memory area is substantially initialized.

3. CACS: COMPARE CONTROL MEMORY (CCM) ACCESS—Access to the compare control memory area is enabled in lieu of access to the content addressable memory area which is usually accessable.

4. COMPF0: BIT PATTERN SEARCH—A search for a bit pattern is made. Data shift in the data input registers (DIR0–2) 310 to 330 is made in units of one bit. A masking operation is possible by referring to only the mask register. The COMPF0 has the following option field.

SH: This designates the shift (ON/OFF) of input data.

OUT0: This designates the output of an interruption request signal upon matching detection (INTERRUPTION REQUEST OUTPUT ON/OFF).

OUT1: This designates the substitution (CODE MIX) or non-substitution (RAM OUT) of an internal condition code for a part of data outputted from the RAM to the DOR.

MR: This designates the reference (ON/OFF) to the mask register.

ME: In the case where multi-matching occurs, this field selects whether the advance to the next step should be taken after all the results of matching have been read from the data output register (DOR) 340 (ON) or after only the first result of matching has been read from the data output register (DOR) 340 (OFF).

5. COMPF1: ONE-BYTE CODE CHARACTER STRING SEARCH—A search for a one-byte code character string is made. Data shift in the data input registers (DIR0–2) 310 to 330 is made in units of one byte. A masking operation is designated by an option field. The COMPF1 has the following option fields in addition to SH, OUT, ME fields similar to those mentioned in conjunction with the COMPF0.

AK: This selects either an anchor search (ON) or an non-anchor search (OFF).

APXM3-0: These designate independently the executions (ON/OFF) of four kinds of approximate search sequence.

BMSK3-0: These designates the setting (ON/OFF) of one-bit mask to the same bit position of each byte and that setting position.

6. COMPF2: TWO-BYTE CODE CHARACTER STRING SEARCH—A search for a two-byte code character string is made. Data shift in the data input registers (DIR0–2) 310 to 330 is made in units of two bytes. A masking operation is designated by an option field. The COMPF2 has option fields quite similar to those of the COMPF1, excepting the following BMSK fields.

BMSK3-0: These designate the setting (ON/OFF) of a one-bit mask to the same bit position of bytes 0 and 1 and that setting position.

7. COMPF3: TWO-BYTE CODE CHARACTER STRING SEARCH—A search for a two-byte code character string is made. Data shift in the data input registers (DIR0–2) 310 to 330 is made in units of two bytes. A masking operation is designated by an option field. The COMPF3 has option fields quite similar to those of the COMPF1, excepting the following BMSK fields.

BMSK3-0: These designate the setting (ON/OFF) of a one-bit mask to the same bit position of bytes 1 and 3 and that setting position.

Next, the constructions of the respective parts of the embodiment shown in FIG. 3 will be explained together with more detailed embodiments.

Figure 6:
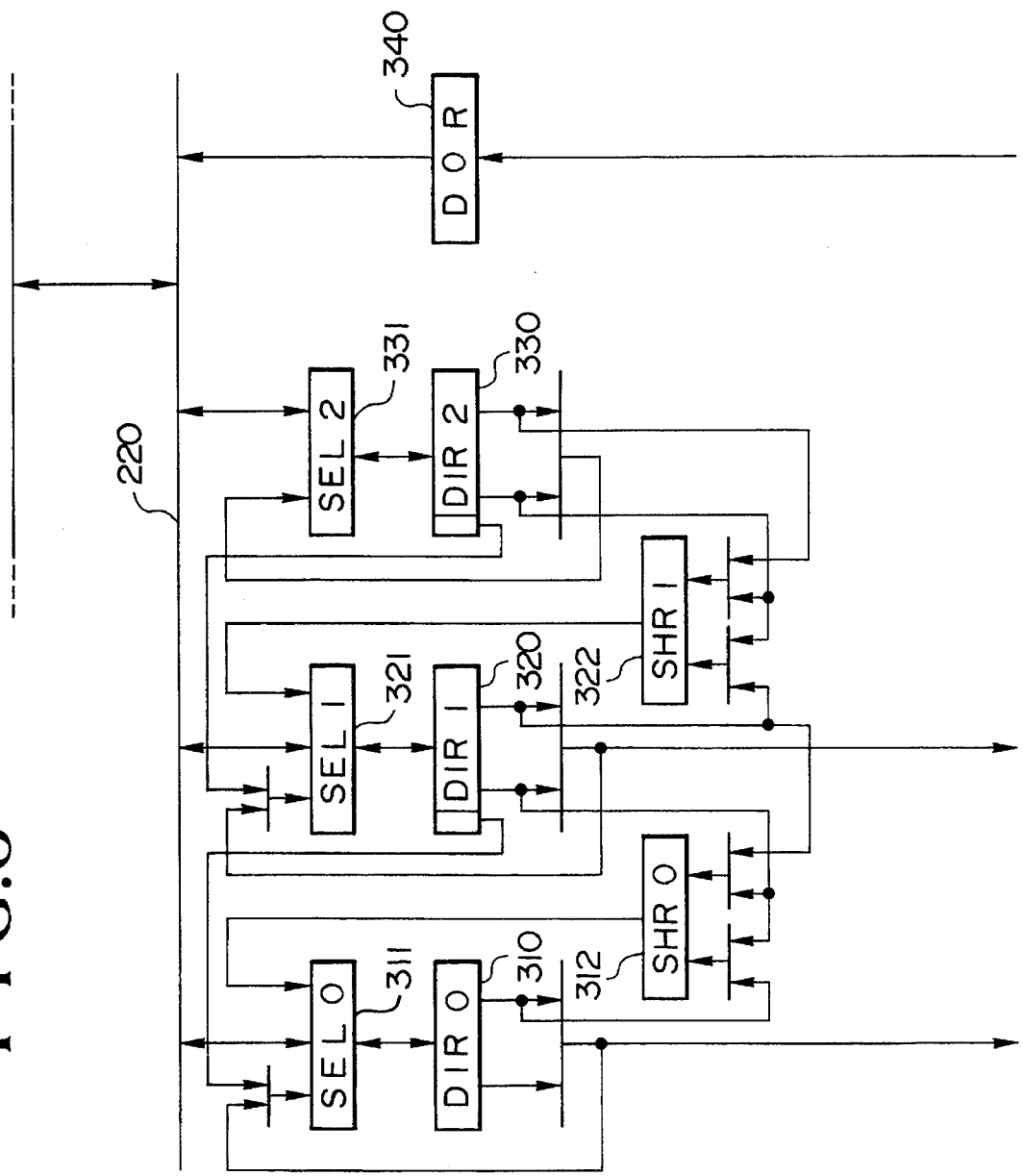
FIG. 6 is a block diagram for explaining a more detailed embodiment the data input/output means of the search module shown in FIG. 3.

FIG. 6 shows a more detailed embodiment of the data input/output section 300. Data input registers (DIR0) 310, (DIR1) 320 and (DIR2) 330 and a data output register (DOR) 340 are connected to an internal bus 220 in the search module and are all accessable from the CPU. Buffer regsiters (SHR0) 312 and (SHR1) 322 and selectros (SEL0) 311, (SEL1) 321 and (SEL2) 331 for shifting are provided for data shift in the data input registers (DIR0–2) 310 to 330.

In the case of one-byte shift, the buffer register (SHR0) 312 forms the data input register (DIR0) 310 after one-byte shift from an upper byte of the data input register (DIR0) 310 and a power byte of the data input register (DIR1) 320, and the buffer register (SHR1) 322 forms the data input register (DIR1) 320 after one-byte shift from a lower byte of the data input register (DIR1) 320 and an upper byte of the data input register (DIR2) 330. In the case of two-byte shift, the buffer register (SHR0) 312 forms the data input register (DIR)) 310 after two-byte shift from the data input register (DIR1) 320, and the buffer register (SHR1) 322 forms the data input register (DIR1) 320 after two-byte shift from the data input register (DIR2) 330. In the case of a one-bit shift, the buffer register (SHR0) 312 forms the data input register (DIR0) 310 after a one-bit shift from the most significant bit of the data input register (DIR1) 320 and the data input register (DIR0) 310, and the buffer register (SHR1) 322 forms the data input register (DIR1) 320 after a one-bit shift from the most significant bit of the data input register (DIR2) 330 and the data input register (DIR1) 320.

Figure 7:
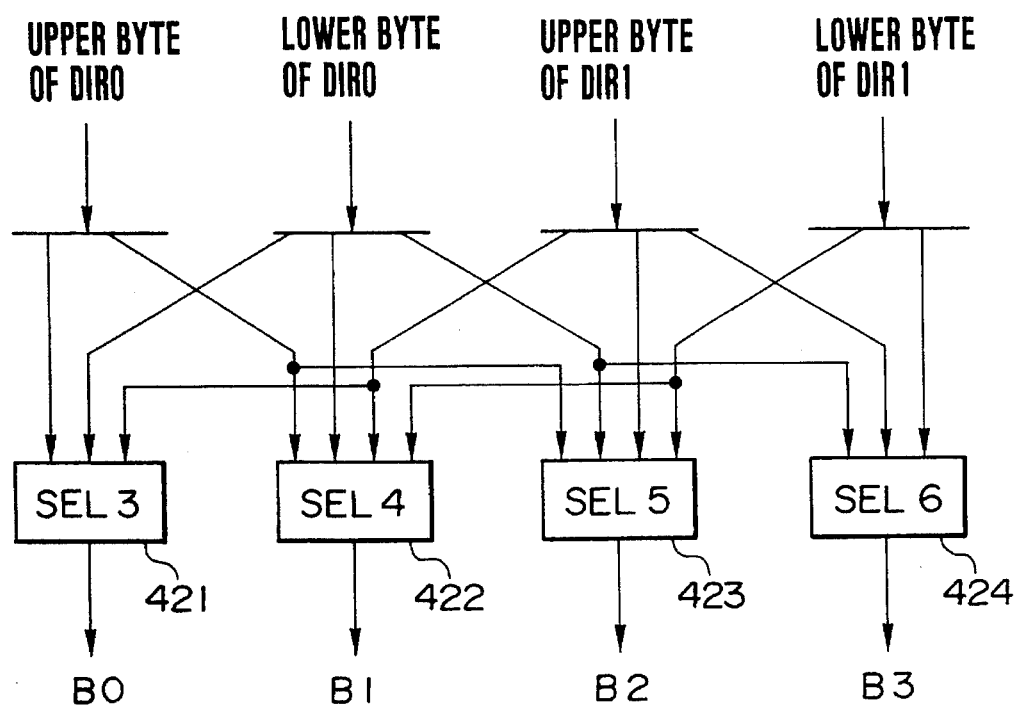
FIG. 7 is a block diagram for explaining a more detailed embodiment of a path selector of the search module shown in FIG. 3.

FIG. 7 shows a more detailed embodiment of the path selector 420. In order to make an approximate search of text data for a character string set in the content addressable memory area, the path selector includes selectors (SEL3–6) 421 to 424 for changing the byte position of four-byte data which is the contents of the DIR0 and DIR1. For example, in the case of a search for a pattern including the interchange of two adjacent characters, the four-byte data is transferred to the content addressable memory area with the positions of two any adjacent bytes among B0, B1, B2 and B3 being interchanged.

The construction shown in FIG. 7 also has byte position changing functions for both one-byte data and two-byte data. The selection of either the function for one-byte data or the function for two-byte data is made by a command which is to be set into the function definition register 820.

Figure 8:
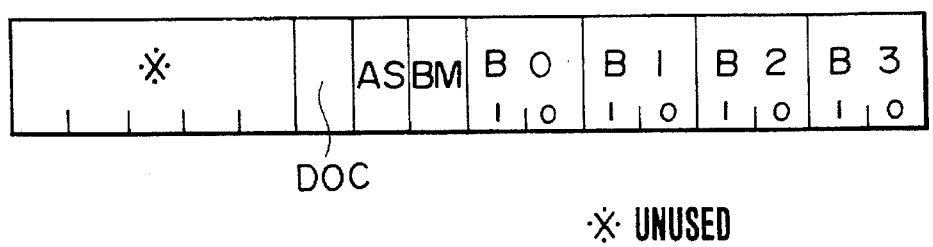
FIG. 8 is a diagram for explaining the format of a compare control memory of the search module shown in FIG. 3.

FIG. 8 shows an embodiment of the format of the compare control memory 600. Each word of the compare control memory 600 has a one-to-one correspondence to each word of the content addressable memory 500. When the comparing of characters or data stored in the content addressable memory 500 and text data is made, the reference to each word of the compare control memory 600 is made as a compare condition for the corresponding word of the content addressable memory 500. One word is composed of the following subfields having meanings which are given hereinbelow.

DOC: This indicates whether the content of a corresponding word of the content addressable memory area is a delimiter or a character.

AS: In the case where a character string search command is set in the function definition register 820, this subfield indicated whether or not an approximate search sequence designated by the command should be executed.

BM: In the case where a character string search command is set in the function definition register 820, this subfield indicates whether or not the reference to a bit mask designation designated by the command should be made.

B0–3: These designate a condition for compare of characters or data stored in the content addressable memory 500 and text data in units of one byte. Each subfield designates one of the four following compare conditions by use of two bits.

pstv (positive logic): A matching is determined in the case where the stored character or data and the text data are equal to each other.

ngtv (negative logic): A matching is determined in the case where they are different from each other.

dntc (don't care): A matching is always determined.

invd (invalid): A mismatching is always determined.

Figure 9:
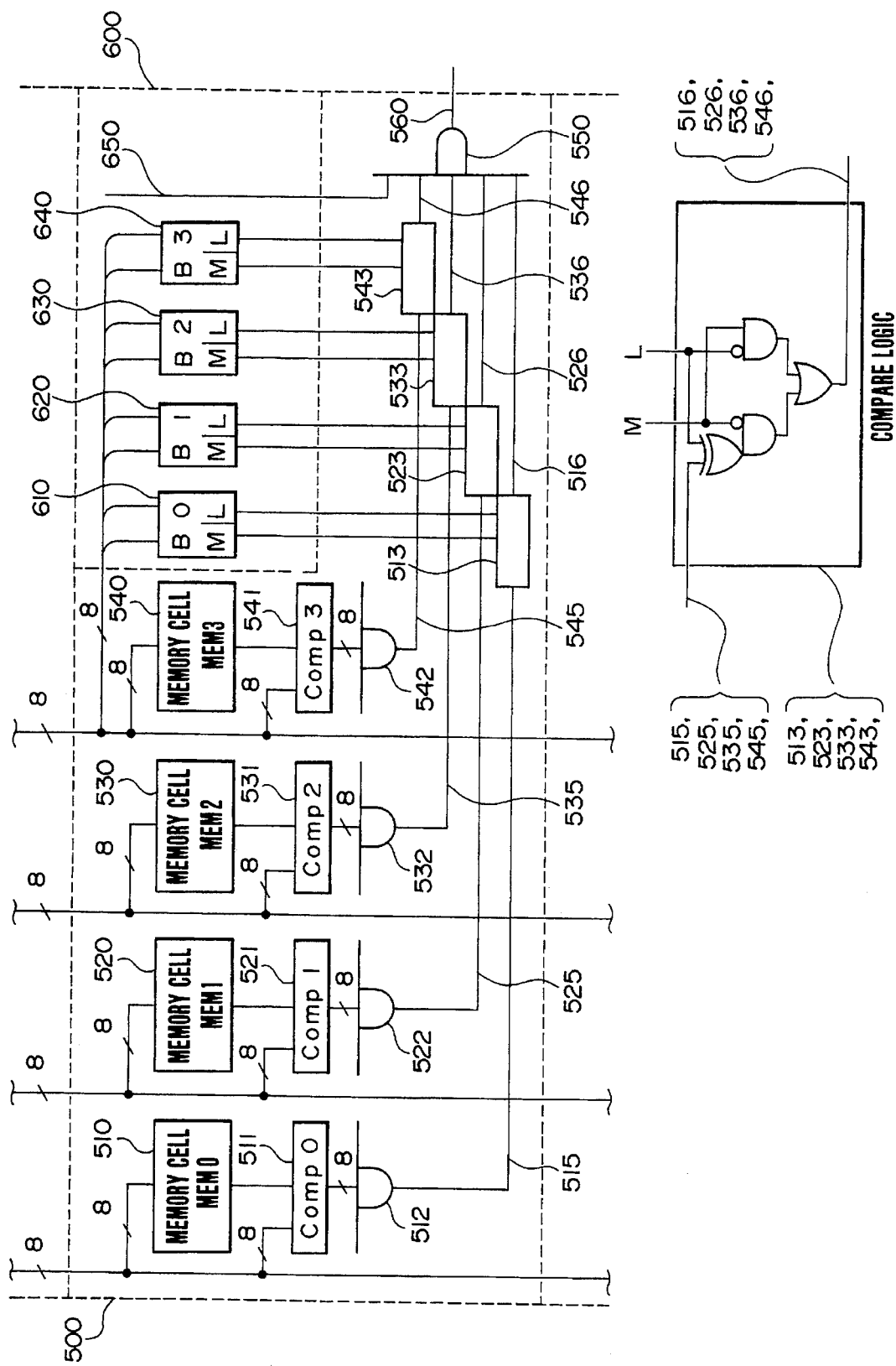
FIG. 9 is a block diagram for explaining an embodiment of a content addressable memory of the search module shown in FIG. 3.

FIG. 9 shows an embodiment of the content addressable memory 500. The content addressable memory makes a compare of characters or data stored therein and text data while referring to the compare control memory 600.

In FIG. 9, each of the content addressable memory 500 and the compare control memory 600 is shown to have a construction of one word, and data lines, memory cells and comparators are shown in units of eight bits. The overall content addressable memory and compare control memory includes the repetition of the shown construction. The following explanation will be made of the shown one-word construction and its operation.

In a data set mode, the write of data into memory cells (mem0) 510, (mem1) 520, (mem2) 530 and (mem3) 540 of the content addressable memory and memory cells (B0) 610, (B1) 620, (B2) 630 and (B3) 640 of the compare control memory is possible. The connection of data paths between the data lines and the memory cells is established by the control section 800 in accordance with the content of the function definition register (FDR) 820. A character string or a partial character string is set into the content addressable memory 500, and compare conditions are set into the compare control memory 600. In a search mode, the connection of data paths between the data lines and comparators (comp0) 511, (comp1) 521, (comp2) 531 and (comp3) 541 is established. The text data on the data lines and the character string or partial character string stored in the memory cells (mem0–3) 510 to 540 of the content addressable memory 500 are inputted to the comparators (comp0–3) 511 to 541 to make a compare for each bit. The results of compare in units of one bit are ANDed by logical AND gates 512,522, 532 and 542 in units of one byte to produce the results 515, 525, 535 and 545 of compare in units of one byte. For these results, compare logics 513, 523,533 and 543 liberate the compare conditions stored in the memory cells (B0–B3) 610 to 640 of the compare control memory. A detailed embodiment of the compare logic is shown in FIG. 9. Inputs of the compare logic include the result for one byte and a compare condition represented by two bits (indicated by M and L bits in FIG. 9). For these inputs, the results 516, 526, 536 and 546 in units of one byte taking the compare conditions into consideration are output in accordance with a truth table shown in FIG. 10. Finally, a logical AND of the results for the four bytes is produced by an AND gate 550. Thereby, the search-out of the character string or partial character string set in the content addressable memory is outputted as a matching signal 560. The AND gate 550 has an input for a control signal 650 which invalidates the matching signal unconditionally.

Figure 11:
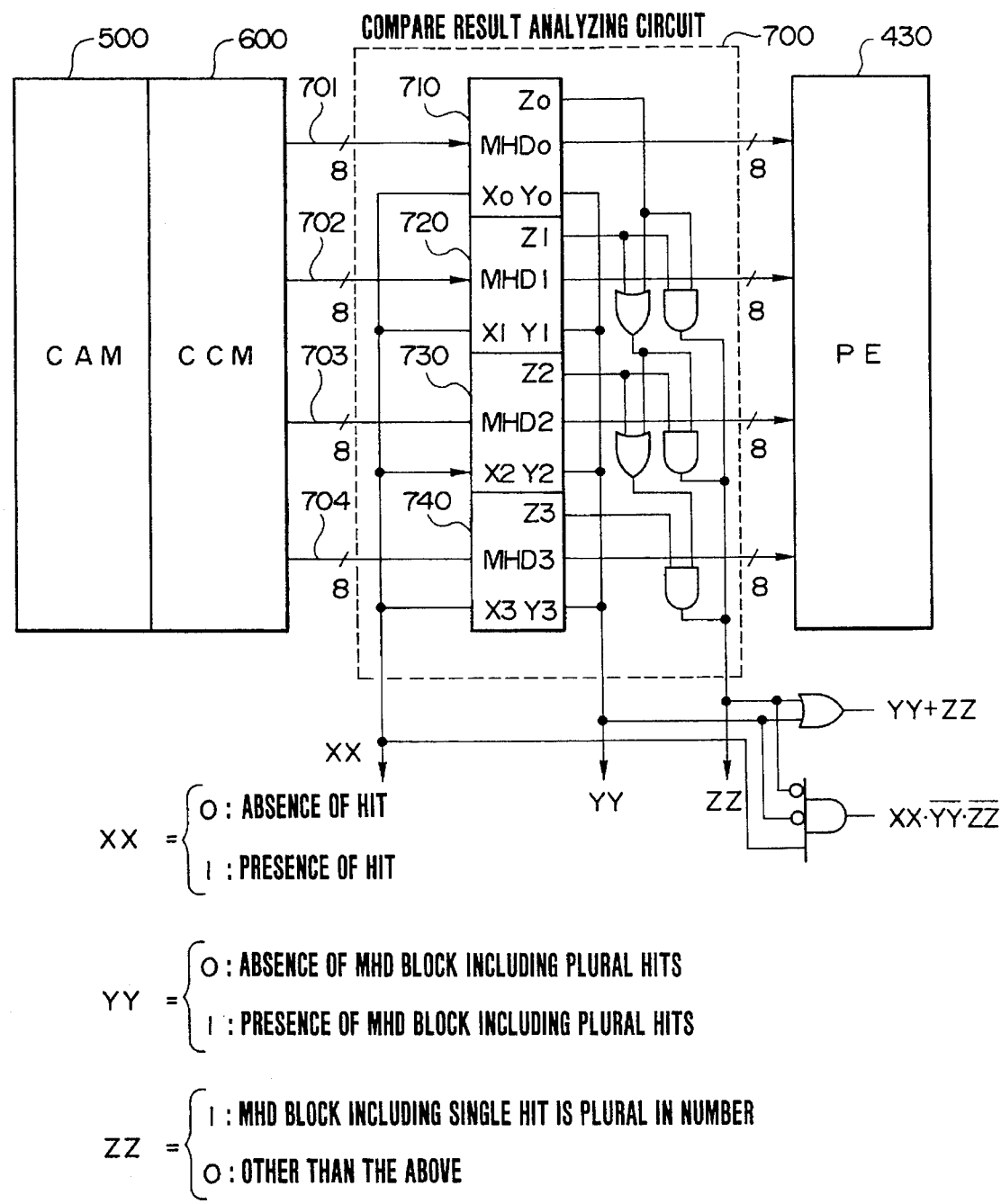
FIG. 11 is a block diagram for explaining an embodiment of a compare result analyzing circuit of the search module shown in FIG. 3.

FIG. 11 shows an embodiment of the compare result analyzing circuit 700. The compare result analyzing circuit 700 receives a matching signal from the content addressable memory 500 and outputs signals XX, YY and ZZ for examining the presence/absence of a hit in the matching signal and for examining in the case of the presence of hit whether or not the number of hits is plural. The matching signal from the content addressable memory 500 is passed through the priority encoder (PE) 430. The construction of the present embodiment has, as a fundamental constituent unit, blocks (MHD0) 710, (MHD1) 720, (MHD2) 730 and (MHD3) 740 for making the analysis of plural hits for eight-bit matching signals 701, 702, 703 and 704. The compare result analyzing circuit 700 includes the MHD0–3 and logical circuits for producing the outputs XX, YY and ZZ from outputs X0–3, Y0–3 and Z0–3 of the MHD blocks.

Figure 12:
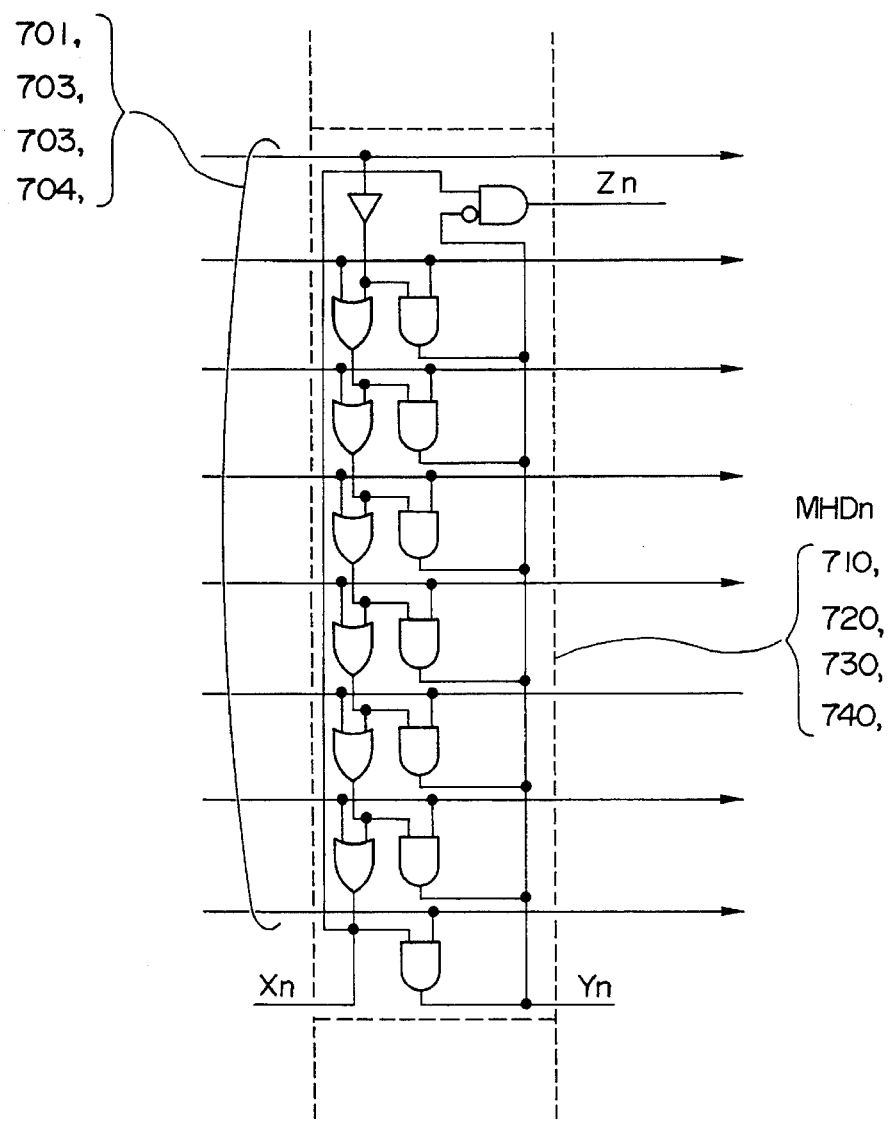
FIG. 12 is a block diagram for explaining an embodiment of a plural-hit analyzing block in the compare result analyzing circuit shown in FIG. 11.

The detailed construction of the MHD is shown in FIG. 12. MHDn (n= 0–3) receives the matching signals 701, 702,703 and 704 for eight words and outputs Xn which indicates the presence/absence of a hit in eight bits, Yn which indicates either plural hits or the other, and Zn which indicates either a single hit or the other. XX is produced from X0–3, YY from Y0–3, and ZZ from Z0–3. The XX indicates the presence/ absence of a hit over all the matching signals, the YY indicates the presence/absence of an MHD block including plural hits, and the ZZ indicates whether or not an MHD block including a single hit is plural in number. In this manner, it becomes possible to obtain a logic YY+ZZ which indicates the presence of plural hits and a logic XX·$\overline{YY}$·ZZ which indicates a single hit or the presence of only one hit. The information necessary for a sequence control is sent to the control section 800.

The present embodiment can also be realized with the other number of MHD blocks and the other number of input signals of the MHD block.

FIG. 13 shows an embodiment of the format of the data output register (DOR) 340. Depending on the value of an OUT0 bit of a character string search command set in the function definition register 820, the format is classified into RAM OUT in which the content of the RAM 440 is outputted as it is and CODE MIX in which the content of a lower byte of the RAM and internal information are outputted together.

In the case of RAM OUT, the content of the non-hit register is held in the data output register if there is no hit. If there is any hit, the content of the RAM is held in the data output register. Accordingly, there is no special format.

In the case of CODE MIX, the content of the non-hit register is held in the data output register. If there is any hit, an upper byte of the data output register is substituted by an internal code. The upper byte is composed of the following subfields. However, when a bit pattern search is designated, AH and NOA subfields do not exist.

MH: This indicates either plural hits or a single hit.

SW: This indicates that the write of data, which is not used for a search processing, was made.

IF: This monitors the set/reset condition of an interruption request signal.

AH: This indicates hit in an approximate character string search sequence.

NOA: This indicates the id number of the approximate character string search sequence.

RS: This indicates the number of times of remaining data shift in the data input registers.

According to the present embodiment, not only the read of the content of the RAM but also the read of internal information of the search module required by the CPU for a control of a search processing become possible by an address of the content addressable memory having the content matching with text data.

Figure 14:
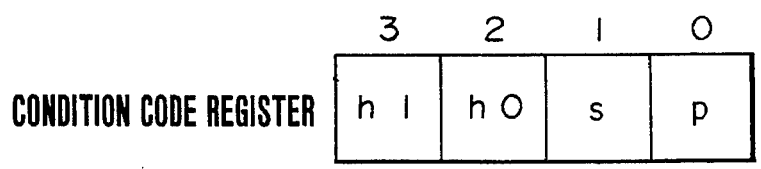
FIG. 14 is a diagram for explaining the format of a condition code register of a control section of the search module shown in FIG. 3.

FIG. 14 shows an embodiment of the condition code register (CCR) 810 which is the condition holding means. The condition code register 810 is constructed with four bits and is composed of an h1 bit, an h0 bit, an s bit and a p bit. The h1 and h0 bits indicate the result of compare, the s bit indicates the presence/absence of remaining text data shift in the data input registers, and the p bit indicates whether or not data written in the search module 200 immediately before is to be used for a search processing. The details thereof are as follows, depending on the content of the function definition register 820.

In the case of NOP (NON-OPERATION), (h1, h0)= 00 (fixed), and s and p are undefinite.

In the case of CRST (CONTENT ADDRESSABLE MEMORY RESET), (h1, h0)=11 (fixed), and s and p are undefinite.

In the case of CACS (COMPARE CONTROL MEMORY ACCESS), (h1, h0)=01 (fixed), and s and p are undefinite.

In the case of COMPFn (n=0–3), that is, a bit pattern search or a character string search,

| | | |
|---|---|---|
| (h1, h0) | = 00 | presence of single hit, |
| | 01 | absence of hit, |
| | 10 | presence of plural hits, |
| | 11 | during execution of search sequencey, |
| s | = 0 | absence of remaining shift, |
| | 1 | presence of remaining shift, |
| p | = 0 | text data written immediately before is to be used for search, |
| | 1 | text data written immediately before is not to be used for search. |

According to the present embodiment, the read of internal information of the search module required by the CPU for a control of a search processing becomes possible from the content of the condition code register. Though this internal information can also be known from the content of the data output register, the provision of the control line bus 230 for direct connection of the condition code register and the CPU makes it possible to omit register access. Accordingly, there is obtained an effect that a higher-speed search processing can be performed.

Figure 15:
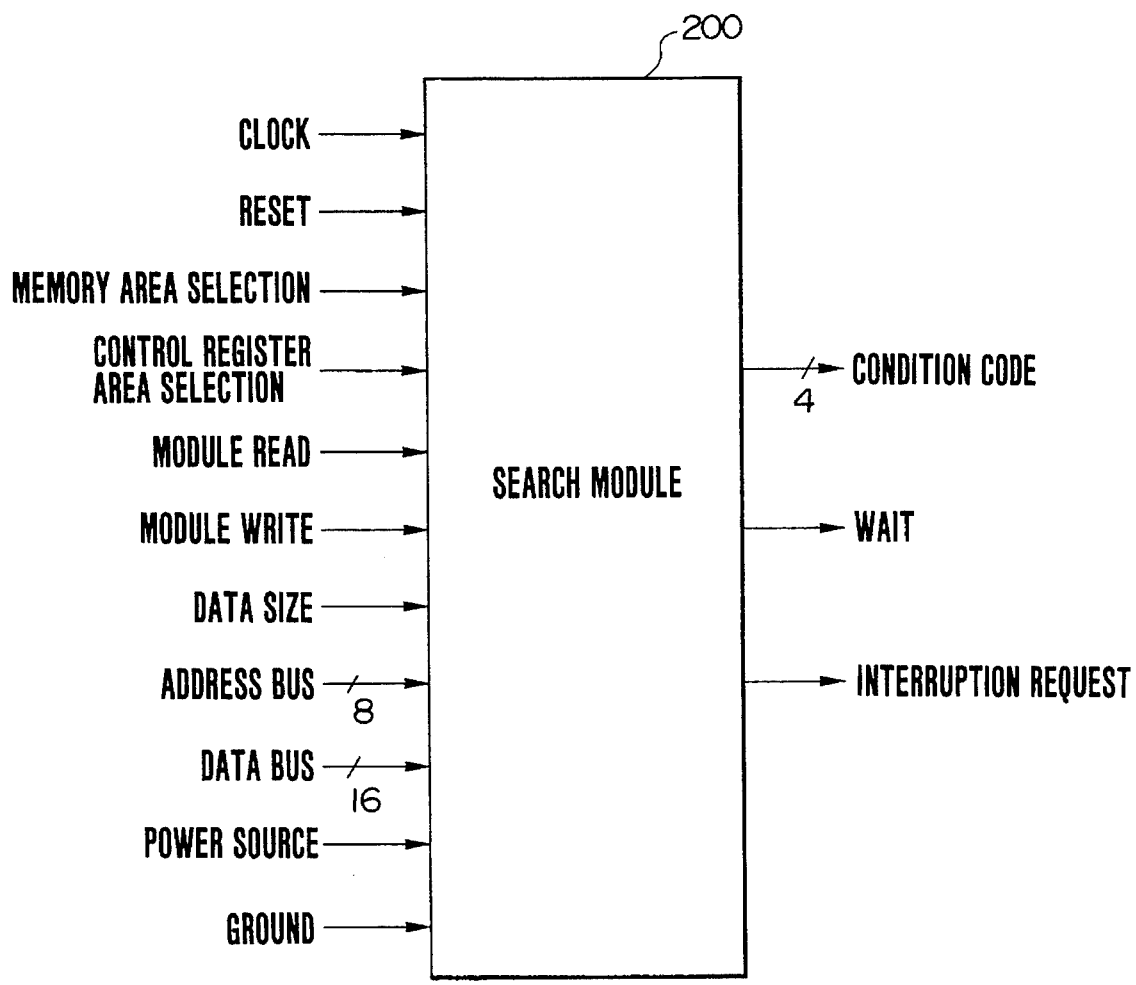
FIG. 15 is a diagram for explaining an embodiment of input and output signals of the search module.

FIG. 15 shows an embodiment of input and output signals of the search module 200. The construction shown in FIG. 15 can be realized using either the positive or negative polarity of each input/output signal. A clock signal, a power source or ground may be plural in number. An address bus or a data bus can also be realized with the number of bits other than that shown.

Figure 16:
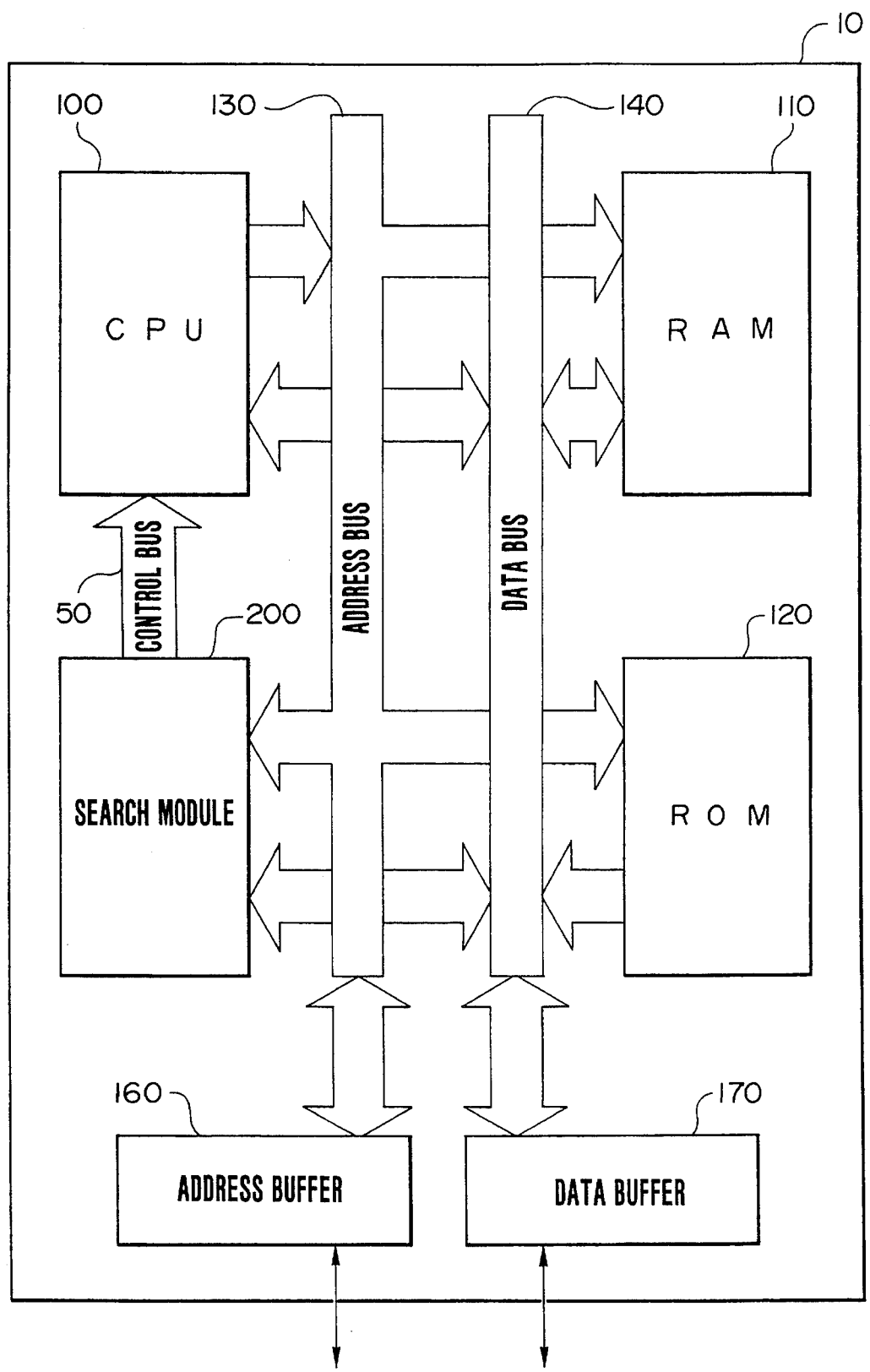
FIG. 16 is a block diagram for explaining an embodiment of a search processor in which the construction of the first embodiment of the present invention is integrated on one chip.

FIG. 16 is a block diagram of a search processor (or a single-chip microcomputer) 10 which is integrated on one chip with the search module of the present invention being incorporated.

The search processor 10 includes a CPU 100, a RAM 110, a ROM 120 and a search module 200 of the present invention. These components are connected through an address bus 130 and a data bus 140. Also, the search module 200 and the CPU 100 are connected through a control bus 150 including a condition code, a wait signal and an interruption request signal. A communication with the exterior is made through an address buffer 160 and a data buffer 170. By using the search module of the present invention, there is obtained an effect that the speed of a character string search processing performed on a software in the prior art can be improved. The present embodiment can also be realized as a search processor with another construction so long as the CPU and the search module are included.

Figure 17:
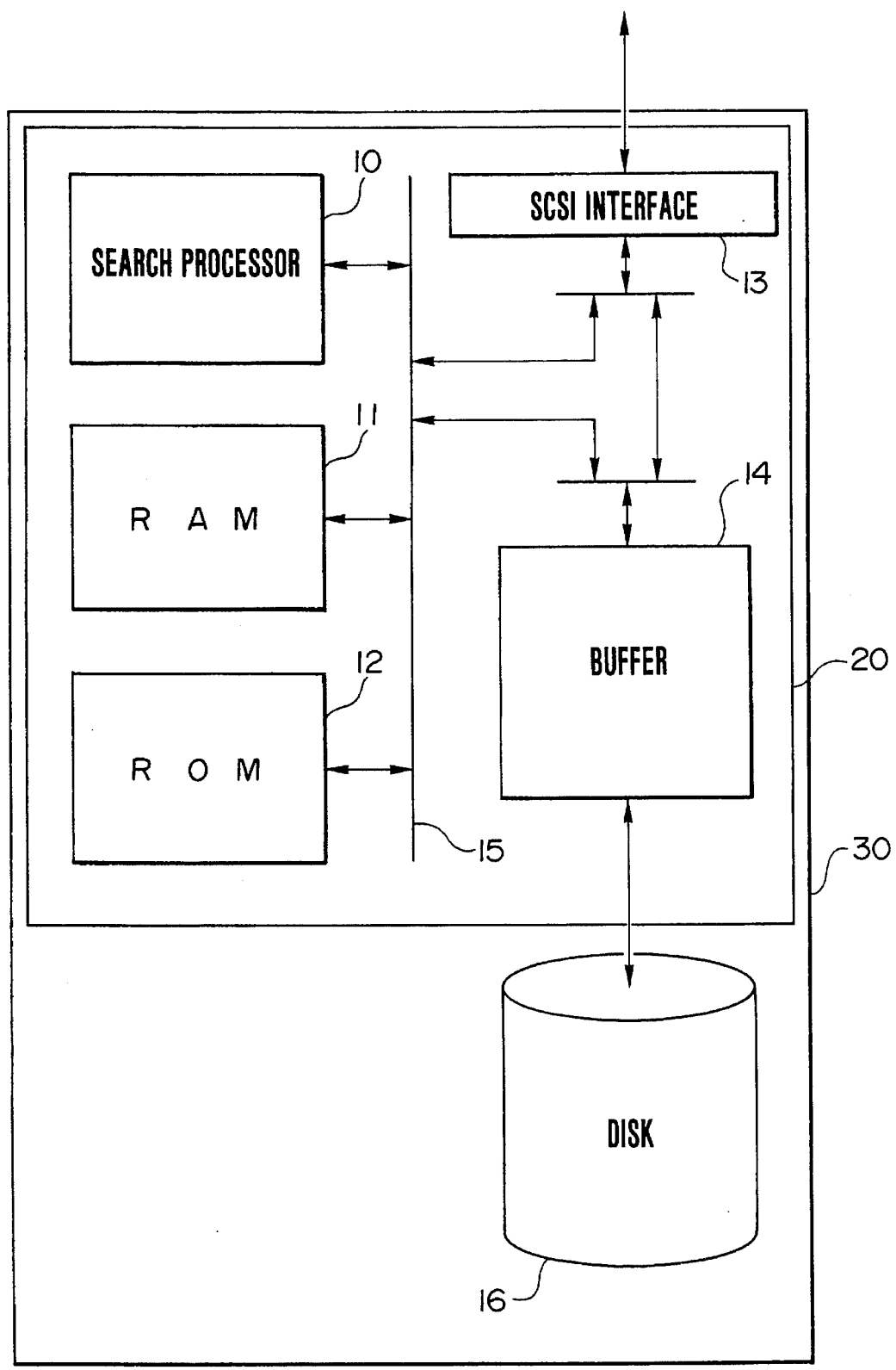
FIG. 17 is a block diagram for explaining an embodiment of a magnetic disk system which has the search processor of FIG. 16 incorporated therein and is therefore provided with a character string search function.

FIG. 17 shows an embodiment of a magnetic disk system 30 in which the search processor 10 of the present invention is incorporated as a controller. The present embodiment includes a disk unit 16 and a disk controller section 20. The disk controller section 20 is composed of an SCSI interface 13 for making a communication of data and commands with a host CPU, a buffer 14 for temporarily storing data, the search processor 10 used as a controller, a RAM 11 used as a work area, and a ROM 12 for storing a program and data of the search processor 10. The interface for the host CPU can also be realized with an interface other than the SCSI interface.

The present embodiment not only serves as the conventional magnetic disk system with a controller incorporated but also has a function of searching for data stored in the disk owing to the use of the search processor 10. Namely, the system is provided with a normal mode in which the system is used as a usual magnetic disk device by means of the conventional SCSI interface and a search mode in which a search function based on a string search is performed. A bit pattern, to which an SCSI command is not allotted, is used as a mode change-over command to make a change-over between both the modes. The designation for a search function is made after a search mode has been established by the mode change-over command. In the search mode, when a search processing is designated, the search processor 10 compares data of the buffer read from the disk and a character string(s) to be searched out. After the search processing has been completed, the search processor 10 informs the host CPU of whether or not there is a character string(s) matched. This can be realized, for example, in such a manner that the magnetic disk system 30 makes an interruption to the host CPU or in such a manner that the host CPU reads the result of search held by the magnetic disk system 30. After having brought the magnetic disk system into a normal mode, the host CPU reads only necessary data in accordance with the result of search.

The interface between the magnetic disk system 30 and the host CPU may take a construction in which an extended interface is added to the SCSI interface. If a distinction between the normal mode and the search mode is made by the extended interface portion, the transfer of a command for mode change-over becomes unnecessary. Thereby, a further speed-up is attainable.

Figure 18B:
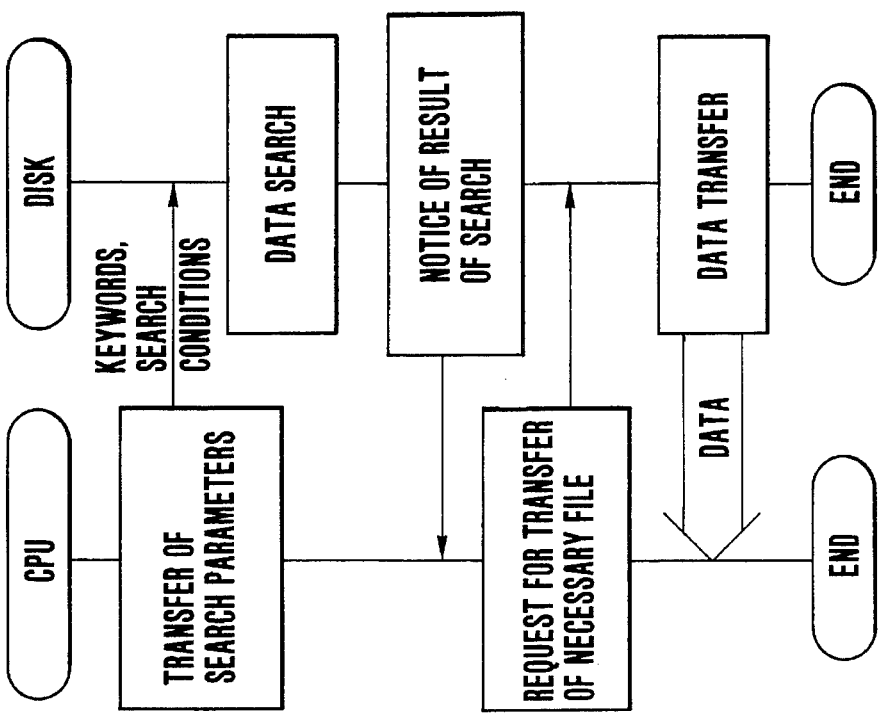
FIGS. 18A and 18B are diagrams for comparatively explaining the operation of the conventional magnetic disk system and the operation of the inventive magnetic disk system of FIG. 17 provided with the character string search function, respectively.
Figure 18A:
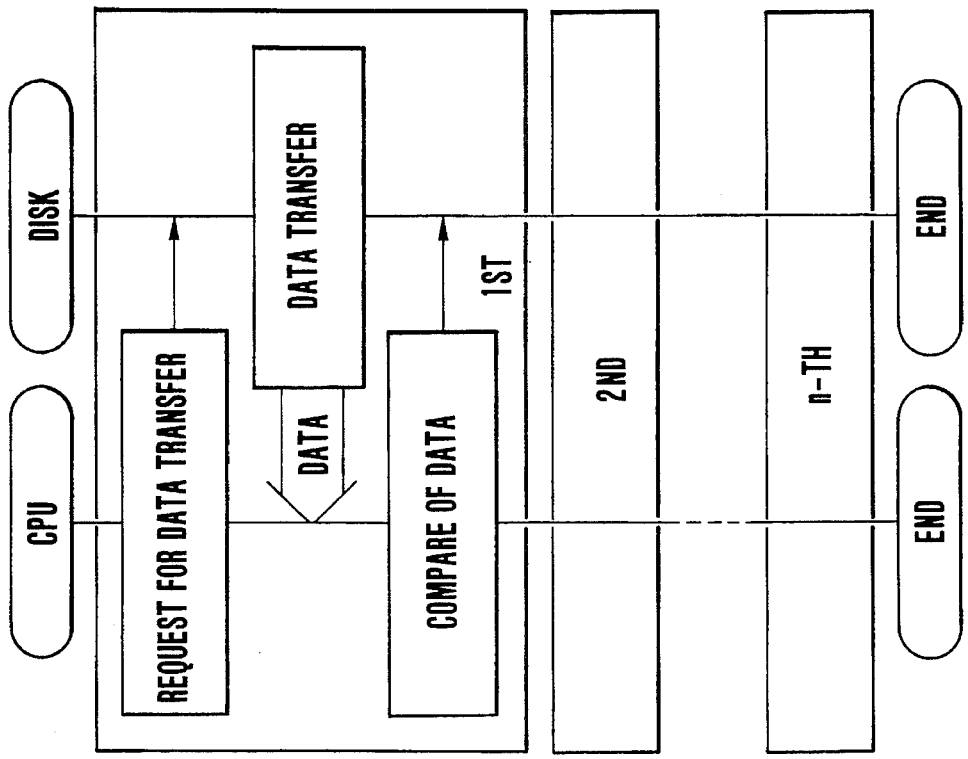

FIGS. 18A and 18B comparatively show the conventional procedure and the inventive procedure for a character string search from data in a disk, respectively. In the conventional procedure, data is transferred from a disk in accordance with a data transfer request from a host CPU and the host CPU performs a search for the data to select necessary data therefrom. In this case, if the amount of data to be searched is large, the data transfer is made plural times. In other words, there is a problem that the transfer amount of useless data becomes very large. On the other hand, in the present invention, a search processing is performed in the magnetic disk system. Therefore, it is not necessary to make useless data transfer between the disk and the host CPU which was made in the conventional system. Accordingly, data transfer at a speed higher than that in the conventional system becomes possible. This brings about an effect of improving the efficiency in utilization of the SCSI bus. Also, the present embodiment makes it possible to provide a novel function of content search which was not offered by the conventional magnetic disk system.

The construction of the present embodiment using a search processor as a controller is also applicable to a semiconductor disk system such as a RAM disk system or an optical disk system which uses a CD-ROM or the like.

Figure 19:
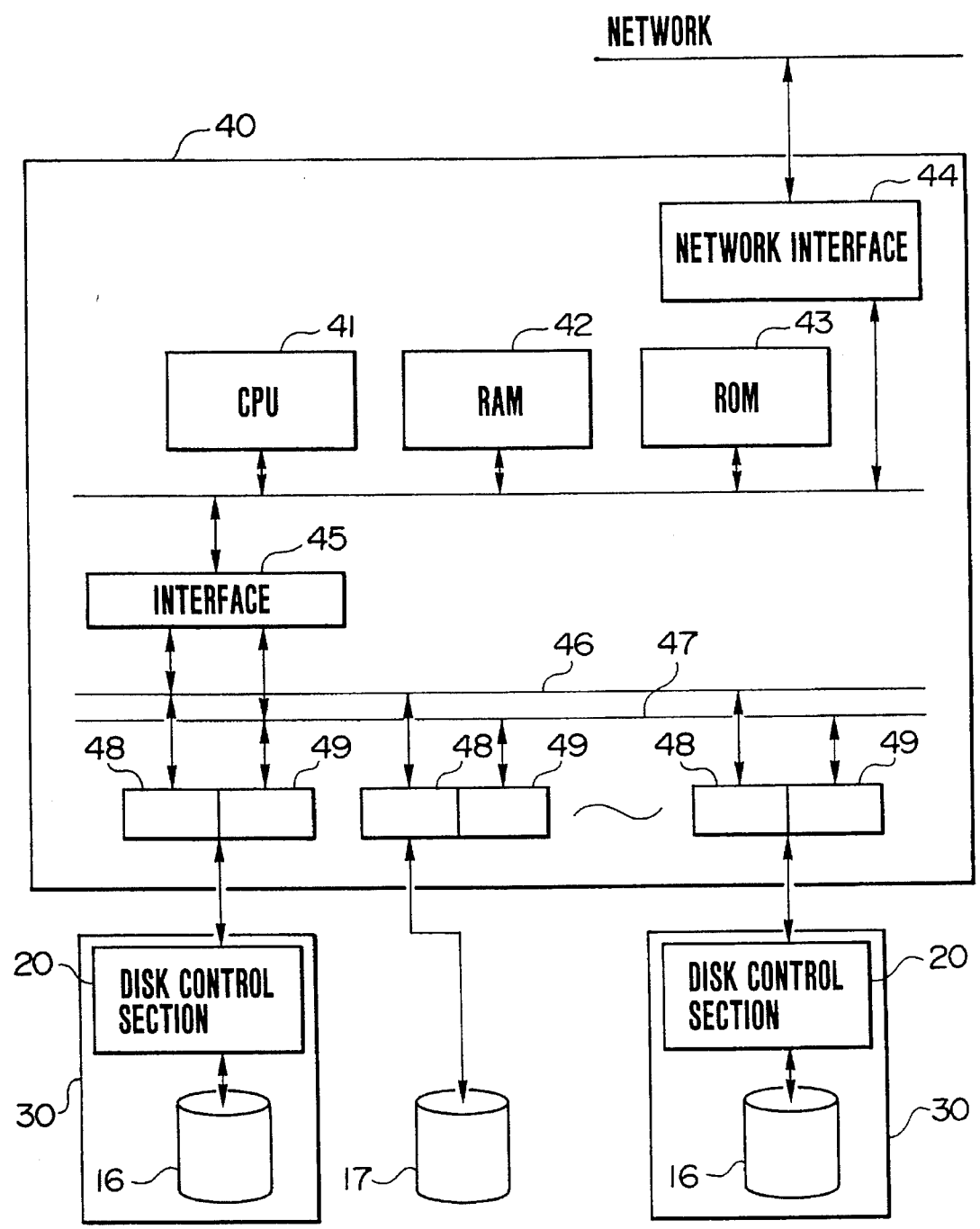
FIG. 19 is a block diagram for explaining a host CPU system which includes an interface for the magnetic disk system of FIG. 17 having the character string search function.

FIG. 19 shows an embodiment of a search system provided with a host CPU system 40 having an interface for the magnetic disk system shown in FIG. 17. To an internal bus are connected a CPU 41, a RAM 42, a ROM 43, interface means 44 for a network, and interface means 45 for a secondary storage system such as a magnetic disk system. The interface means 45 for the secondary storage system is also connected to an SCSI bus 46 and an extended bus 47 which are in turn connected to the secondary storage system through an SCSI interface port 48 and an extended interface port 49, respectively. When a command is transferred to the magnetic disk system 30 (as shown in FIG. 17) having a search function, the extended bus 47 is used to inform the system 30 that an extended command is concerned. Accordingly, the magnetic disk system 30 and the host CPU system 40 make, the designation of a character string search and a control for transfer of a necessary file based on the result of search, through the SCSI bus and the extended bus.

By thus using the SCSI bus and the extended bus, it becomes possible for the host CPU system 40 to possess an ordinary generalized interface as well as an interface for a magnetic disk system with an extended interface having a character string search function. In addition, if only the generalized interface portion is used, the connection to a magnetic disk 17 with the conventional SCSI interface can be made easily.

A similar construction can also be realized using a magnetic disk system in which a search processing is performed through a change-over between a normal mode and a search mode by a mode change-over command. Further, if there is not a magnetic disk system having an extended interface, the extended bus 47 and the extended interface 49 can be omitted from the host CPU system 40, thereby making the reduction in hardware scale possible.

According to the present invention, there are obtained the following effects.

A CPU and a search module are connected by not a special data bus but a generalized bus. Therefore, seeing from the CPU, the search module looks as though it is address-mapped. Accordingly, the execution of a search processing and the acquisition of the result can be made easily in a procedure similar to the procedure of data transfer for a memory. Also, the search module can be mapped at any address. Therefore, in the case where the configuration of a single-chip microcomputer is employed, good matchability with another module is obtained. Further, since the search module performs only a leading collation processing, it can be realized with a small-scale hardware. Therefore, the CPU and the search module can be integrated as a search processor on the same chip, thereby improving the speed of data transfer between the CPU and the search module. As apparent from the foregoing, there is an effect that a character string search by a single-chip microcomputer can be performed at a much higher speed as compared with that by the conventional apparatus. Furthermore, an applied system can be structured with a hardware scale smaller than that in the prior art. Accordingly, there is also obtained an effect that a content search function, which was not provided in the prior art, can be realized by applying the search processor to a secondary storage system.

We claim:

1. A symbol string search apparatus for making a decision of whether or not a symbol string to be searched for exists in a symbol string to be searched, which is composed of symbols represented by codes, in a leading collation processing of a search to be combined with a posterior collation processing of the search, the symbol string search apparatus being connected to a CPU through an address bus and a data bus and comprising:

function definition means connected to said data bus, for receiving from said CPU a command defining a function to be performed by the symbol string search apparatus, said function definition means holding said command until it receives a next command from said CPU;

data input/output means for receiving a symbol string to be searched through said data bus and for providing a search result output;

search processing means for performing said leading collation processing based on a function defined by said function definition means by matching the symbol string to be searched for, which is already stored in said search processing means, with the symbol string to be searched which is input to said data input/output means, said leading collation processing being performed plural times for a plurality of symbol strings to be searched while said function definition means is holding said command; and condition holding means for holding data indicative of an internal condition corresponding to the result of the search, the data held in said condition holding means being accessible by said CPU.

2. A symbol string search apparatus according to claim 1, wherein the symbol string search apparatus is formed on a single semiconductor chip.

3. A symbol string search apparatus according to claim 1, wherein at least said CPU, said symbol string search apparatus, and said address bus and said data bus for connecting said CPU and said symbol string search apparatus are formed as a microcomputer on a single semiconductor chip.

4. A symbol string search apparatus according to claim 3, further comprising a RAM and a ROM which are also formed on said single semiconductor chip, whereby a single-chip microcomputer is provided.

5. A symbol string search system for making a decision of whether or not a symbol string to be searched for exists in a symbol string to be searched, which is composed of symbols represented by codes, in a leading collation processing of a search to be combined with a posterior collation processing of the search, comprising:

a host CPU system; and a secondary storage system for storing said symbol string to be searched in a storage medium, said secondary storage system including:

a search processor which has function definition means for receiving from said host CPU system a command defining a function to be performed by the symbol string search system, said function definition means holding said command until a next command is received from said host CPU system, data input/output means for receiving the symbol string to be searched which is stored in said storage medium and for providing a search result output to said host CPU system, search processing means for performing said leading collation processing based on a function defined by said function definition means by matching a symbol string to be searched for, which is received from said host CPU system, with the symbol string to be searched, which is input to said data input/output means; said leading collation processing being performed plural times for a plurality of symbol strings to be searched while said function definition means is holding said command, and condition holding means for holding data indicative of an internal condition corresponding to the result of the search, the data held in said condition holding means being accessible by said host CPU system.

6. A symbol string search system according to claim 5, wherein an extended command of said host CPU system includes a symbol string search command.

7. A symbol string search system according to claim 5, wherein said host CPU system includes a generalized bus for control of said secondary storage system and an extended bus for performing a symbol string search function in combination with said generalized bus, said host CPU system and said secondary storage system being connected by said generalized bus and said extended bus.

8. A symbol string search apparatus for making a decision of whether or not a symbol string to be searched for exists in a symbol string to be searched, which is composed of symbols represented by codes, in a leading collation processing of a search to be combined with a posterior collation processing of the search, the symbol string search apparatus being connected to a CPU through an address bus and a data bus and comprising:

function definition means connected to said data bus, for receiving from said CPU a command defining a comparison function to be performed by the symbol string search apparatus, said function definition means holding said command until a next command is received from said CPU;

input means for receiving a symbol string to be searched through said data bus;

means for masking data in said input means on a bit basis;

means for making a positional interchange of the data in said input means on a byte basis;

a content addressable memory for storing a symbol string to be searched for and comparing the stored symbol string to be searched for with the symbol string to be searched which has been subjected to the positional interchange by said data path interchange means to perform a comparison function therebetween as defined by said command, said comparison being performed plural times for a plurality of symbol strings to be searched while said function definition means is holding said command;

a comparison condition memory for designating a condition for the comparison in said content addressable memory that defines when a relationship between the symbol string to be searched and the symbol string to be searched for is determined to be matching;

comparison result analyzing means for analyzing words matched from the result of the comparison in said content addressable memory;

matching signal separating means for providing an output of matching signals of the words matched one by one;

an output data memory having an access address designated by said matching signal;

search result output means for providing an output of the content of said output data memory through said data bus;

non-hit data holding means for holding data which is to be output to said search result output means when said output data memory is not accessed; and condition holding means for holding an internal condition of the symbol string search apparatus, the internal condition held in said condition holding means being accessible by said CPU.

9. A symbol string search apparatus according to claim 8, wherein said input means includes a first group of input means having a data path to said content addressable memory and a second group of input means having no data path to said content addressable memory, and said input means successively shifts data input from said second group of input means to said first group of input means while being passed through each input means so that the symbol string to be searched which is stored in said first group of input means is transferred to said content addressable memory.

10. A symbol string search apparatus according to claim 9, wherein the amount of shift of the symbol string to be searched in said input means is made in units having a size selected from one bit, one byte and two bytes.

11. A symbol string search apparatus according to claim 9, wherein the amount of shift is designated by a command set into said function definition means.

12. A symbol string search apparatus according to claim 9, wherein when the symbol string to be searched which is stored in said first group of input means is transferred to said content addressable memory, the arrangement of data is changed in units of one byte.

13. A symbol string search apparatus according to claim 12, wherein a manner of the change of the arrangement of the data of the symbol string to be searched which is stored in said first group of input means, is designated by a command set into said function definition means.

14. A symbol string search apparatus according to claim 8, wherein when the symbol string to be searched is written into said input means, a search processing sequence is activated in accordance with the setting by said function definition means and either data stored in said output data memory or data stored in said non-hit data holding means is outputted to said search result output means.

15. A symbol string search apparatus according to claim 14, wherein when the symbol string to be searched is written, input means for activating the search processing sequence set in said function definition means is designated by a command set into said function definition means.

16. A symbol string search apparatus according to claim 8, wherein the condition of comparison between the symbol string to be searched and the symbol string to be searched for is set in units of one word for the symbol string to be searched which is stored in said content addressable memory, and said condition of comparison includes a condition under which the matching is determined in the case where the symbol string to be searched and the symbol string to be searched for are equal to each other, a condition under which the matching is determined in the case where they are not equal to each other, a condition under which the matching is always determined irrespective of a relationship therebetween, and a condition under which a mismatching is always determined irrespective of a relationship therebetween.

17. A symbol string search apparatus according to claim 8, further comprising an output terminal or interface means for transferring the content of said condition holding means to said CPU directly.

18. A symbol string search apparatus according to claim 8, wherein in the case where the matching between the symbol string to be searched and the symbol string to be searched for is detected, an interruption request signal is outputted.

19. A symbol string search apparatus according to claim 18, wherein whether or not the interruption request signal should be output in the case where the matching between the symbol string to be searched and the symbol string to be searched for is detected, is designated by a command set into said function definition means.

20. A symbol string search apparatus according to claim 18, wherein when the content of said output data memory is output to said search result output means in accordance with a signal indicative of the matching, whether or not a part of said content should be substituted by internal information of the symbol string search apparatus is designated by a command set into said function definition means.

21. A symbol string search apparatus according to claim 8, wherein a mask is set to the same bit position with respect to units of one byte or two bytes for each symbol string to be searched for, which position is stored in said content addressable memory.

22. A symbol string search apparatus according to claim 21, wherein the same bit position to which the mask is set is designated by a command set into said function definition means.

23. A symbol string search apparatus according to claim 8, wherein the contents of said content addresable memory, said comparison condition memory and said output data memory are accessed from said CPU.

24. A symbol string search apparatus according to claim 8, wherein the symbol string search apparatus is formed on a single semiconductor chip.

25. A symbol string search apparatus according to claim 8, wherein at least said CPU, said symbol string search apparatus, and said address bus and said data bus for connecting said CPU and said symbol string search apparatus are formed as a microcomputer on a single semiconductor chip.

26. A symbol string search apparatus according to claim 25, further comprising a RAM and a ROM which are also formed on said single semiconductor chip, whereby a single-chip microcomputer is provided.

27. A symbol string search system for making a decision of whether or not a symbol string to be searched for exists in a symbol string to be searched, which is composed of symbols represented by codes in a leading collation processing of a search to be combined with a posterior collation processing of the search, comprising:

a host CPU system; and a secondary storage system for storing said symbol string to be searched in a storage medium, said secondary storage system including a search processor which has input means for receiving a symbol string to be searched which is stored in said storage medium, means for masking data in said input means in units of one bit, data path interchange means for making a positional interchange of the data in said input means in units of a byte, a content addressable memory for storing a symbol string to be searched for which is received from said host CPU system and for performing said leading collation processing by comparing the stored symbol string to be searched for with the symbol string to be searched, which has been subjected to the positional interchange by said data path interchange means, a comparison condition memory for designating a condition for the comparison in said content addressable memory that defines when a relationship between the symbol string to be searched and the symbol string to be searched for is determined to be matching, comparison result analyzing means for analyzing words matched from the result of the comparison in said content addressable memory, matching signal separating means for providing an output of matching signals of the words matched one by one, an output data memory having an access address designated by said matching signal, search result output means for providing an output of the content of said output data memory to said host CPU system, non-hit data holding means for holding data which is to be output to said search result output means when said output data memory is not accessed, comparison condition definition means for defining a condition of the comparison performed by the symbol string search system, and condition holding means for holding an internal condition corresponding to the result of the search.

28. A symbol string search system according to claim 27, wherein an expanded command of said host CPU system includes a symbol string search command.

29. A symbol string search system according to claim 27, wherein said host CPU system includes a generalized bus for control of said secondary storage system and an extended bus for performing the leading collation processing in combination with said generalized bus, said host CPU system and said secondary storage system being connected by said generalized bus and said extended bus.

* * * * *